(12) United States Patent
Agarwal et al.

(10) Patent No.: US 12,555,359 B2
(45) Date of Patent: Feb. 17, 2026

(54) SYNTHETIC DOCUMENT GENERATION PIPELINE FOR TRAINING ARTIFICIAL INTELLIGENCE MODELS

(71) Applicant: Oracle International Corporation, Redwood Shores, CA (US)

(72) Inventors: Amit Agarwal, Bangalore (IN);
Srikant Panda, Bangalore (IN);
Kulbhushan Pachauri, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 611 days.

(21) Appl. No.: 17/994,712

(22) Filed: Nov. 28, 2022

(65) Prior Publication Data

US 2024/0005640 A1    Jan. 4, 2024

Related U.S. Application Data

(60) Provisional application No. 63/356,720, filed on Jun. 29, 2022.

(51) Int. Cl.
*G06V 10/774* (2022.01)
*G06V 30/413* (2022.01)
*G06V 30/414* (2022.01)

(52) U.S. Cl.
CPC .......... *G06V 10/774* (2022.01); *G06V 30/413* (2022.01); *G06V 30/414* (2022.01)

(58) Field of Classification Search
CPC ...... G06V 10/70; G06V 10/82; G06V 10/774; G06V 30/413; G06V 30/414; G06N 20/00; G06F 40/103
See application file for complete search history.

(56) References Cited

U.S. PATENT DOCUMENTS 10,984,284 B1 * 4/2021 Corcoran ............... G06V 30/40
11,087,081 B1   8/2021 Srivastava et al.
(Continued)

FOREIGN PATENT DOCUMENTS

CN    113936340 A    1/2022

OTHER PUBLICATIONS

Roh, et al. (A survey on data collection for machine learning: A big data—AI Integration Perspective), pp. 1328-1347. (Year: 2021).*
(Continued)

*Primary Examiner* — Daniel G Mariam
(74) *Attorney, Agent, or Firm* — Kilpatrick Townsend & Stockton LLP

(57) ABSTRACT

Embodiments described herein are directed towards a synthetic document generation pipeline for training artificial intelligence models. One embodiment includes a method including a device that receives an instruction to generate a document to be used as a training instance for a first machine learning model, the instruction including an element configuration, a document class configuration, a format configuration, an augmentation configuration, and data bias and fairness. The device can receive an element from an interface based at least in part on the element configuration, the element can simulate a real-world image, real-world text, or real-world machine-readable visual code. The device can generate metadata describe a layout for the element on the document based on the document class configuration. The device can generate the document by arranging the element on the document based on the metadata, wherein the document is generated in a format based on the format configuration.

18 Claims, 20 Drawing Sheets

(56) References Cited

U.S. PATENT DOCUMENTS

| | | | |
|---|---|---|---|
| 11,341,367 | B1 | 5/2022 | Barbosa et al. |
| 2020/0125954 | A1 | 4/2020 | Truong et al. |
| 2021/0133645 | A1 | 5/2021 | Tazi et al. |
| 2021/0158093 | A1 | 5/2021 | Kaynig-fittkau et al. |
| 2023/0147778 | A1* | 5/2023 | Raman ............... G06V 30/1914 382/159 |
| 2023/0334309 | A1* | 10/2023 | Streltsov ............... G06F 40/186 |

OTHER PUBLICATIONS

"Augmentation Pipeline for Rendering Synthetic Paper Printing, Faxing, Scanning and Copy Machine Processes", Available online at: https://github.com/sparkfish/augraphy, Accessed from Internet Apr. 4, 2022, 13 pages.

"Datagen Synthetic Image Datasets for Computer Vision", Available online at: https://datagen.tech/, Accessed from Internet Jun. 1, 2022, 6 pages.

"Welcome to Albumentations Documentation", Available online at: https://albumentations.ai/docs/, Accessed from Internet Apr. 4, 2022, 3 pages.

Biswas et al., "DocSynth: A Layout Guided Approach for Controllable Document Image Synthesis", Available online at: https://arxiv.org/pdf/2107.02638.pdf, Sep. 2021, 15 pages.

Chogovadze et al., "Controllable Data Augmentation Through Deep Relighting", Available online at: https://arxiv.org/pdf/2110.13996.pdf, Oct. 26, 2021, 15 pages.

Delalandre et al., "Generation of Synthetic Documents for Performance Evaluation of Symbol Recognition & Spotting Systems.", International Journal on Document Analysis and Recognition, vol. 13, No. 3, Sep. 2010, pp. 187-207.

Gautam, "Form Data Augmentation", Available online at: https://github.com/gautam-aayush/form-data-augmentation, Mar. 19, 2021, 11 pages.

Journet et al., "DocCreator: A New Software for Creating Synthetic Ground-Truthed Document Images", Journal of Imaging, vol. 3, Available online at: https://hal.archives-ouvertes.fr/hal-01668915/file/jimaging.pdf, Dec. 2017, 18 pages.

Ma, "nlpaug: Data augmentation for NLP", Available online at: https://github.com/makcedward/nlpaug, Accessed from Internet Apr. 4, 2022, 21 pages.

Sebastianelli et al., "Automatic Dataset Builder for Machine Learning Applications to Satellite Imagery", Software X, vol. 15, Available online at: https://www.sciencedirect.com/science/article/pii/S2352711021000728, Jul. 2021, 7 pages.

White, "By 2024, 60% of the Data Used for the Development of AI and Analytics Projects Will Be Synthetically Generated", Available online at: https://blogs.gartner.com/andrew_white/2021/07/24/by-2024-60-of-the-data-used-for-the-development-of-ai-and-analytics-projects-will-be-synthetically-generated/, Jul. 24, 2021, 4 pages.

* cited by examiner

SYNTHETIC DOCUMENT GENERATION PIPELINE FOR TRAINING ARTIFICIAL INTELLIGENCE MODELS

CROSS-REFERENCE TO RELATED APPLICATIONS

This application is claims priority under 35 U.S.C. § 119(e) to U.S. Provisional Application No. 63/356,720, filed on Jun. 29, 2022, the contents of each of which are herein incorporated by reference.

BACKGROUND

A cloud service provider (CSP) can provide multiple cloud services to subscribing customers. These services are provided under different models, including a Software-as-a-Service (SaaS) model, a Platform-as-a-Service (PaaS) model, an Infrastructure-as-a-Service (IaaS) model, and others. In many instances, a cloud services provider can offer on-demand services, such as a document generation service.

BRIEF SUMMARY

Embodiments described herein are directed towards a synthetic document generation pipeline for training artificial intelligence models. One embodiment includes a method for synthetic document generation. The method includes a computing device that receives a control instruction to generate a document to be used as a training instance for a first machine learning model, the control instruction includes an element configuration, a document class configuration, a format configuration, an augmentation configuration, and a data bias and fairness configuration.

The method further includes that the computing device receives an element from an interface based at least in part on the element configuration, the element can be an image, a text, or machine-readable visual code simulating a real-world image, real-world text, or real-world machine-readable visual code.

The method further includes that the computing device generates metadata describing a layout for the element on the document based at least in part on the document class configuration.

The method further includes that the computing device generates the document by arranging the element on the document based at least in part on the metadata, wherein the document is generated in a format based on the format configuration.

The method further includes that the computing device augments the element on the document based at least in part on the augmentation configuration.

Embodiments can further include a computing device, including a processor and a computer-readable medium including instructions that, when executed by the processor, can cause the processor to receive a control instruction to generate a document to be used as a training instance for a first machine learning model, the control instruction including an element configuration, a document class configuration, a format configuration, an augmentation configuration, and a data bias and fairness configuration.

The instructions that, when executed by the processor, can further cause the processor to receive an element from an interface based at least in part on the element configuration, the element can be an image, a text, or machine-readable visual code simulating a real-world image, real-world text or real-world machine-readable visual code.

The instructions that, when executed by the processor, can further cause the processor to generate metadata describing a layout for the element on the document based at least in part on the document class configuration.

The instructions that, when executed by the processor, can further cause the processor to generate metadata describing a layout for the element on the document based at least in part on the document class configuration.

The instructions that, when executed by the processor, can further cause the processor to generate the document by arranging the element on the document based at least in part on the metadata, wherein the document is generated in a format based on the format configuration.

The instructions that, when executed by the processor, can further cause the processor to augment the element on the document based at least in part on the augmentation configuration.

Embodiments can further include a non-transitory computer-readable medium including stored thereon a sequence of instructions that, when executed by a processor, causes the processor to perform operations, including receiving a control instruction to generate a document to be used as a training instance for a first machine learning model, the control instruction comprising an element configuration, a document class configuration, a format configuration, an augmentation configuration, and a data bias and fairness configuration.

The sequence of instructions that, when executed by a processor, can further cause the processor to perform operations, including receiving an element from an interface based at least in part on the element configuration, the element can be an image, a text, or machine-readable visual code simulating a real-world image, real-world text or real-world machine-readable visual code.

The sequence of instructions that, when executed by a processor, can further cause the processor to perform operations, including generating metadata describing a layout for the element on the document based at least in part on the document class configuration.

The sequence of instructions that, when executed by a processor, can further cause the processor to perform operations, including generating metadata describing a layout for the element on the document based at least in part on the document class configuration.

The sequence of instructions that, when executed by a processor, can further cause the processor to perform operations, including generating the document by arranging the element on the document based at least in part on the metadata, wherein the document is generated in a format based on the format configuration.

The sequence of instructions that, when executed by a processor, can further cause the processor to perform operations, including augmenting the element on the document based at least in part on the augmentation configuration.

BRIEF DESCRIPTION OF THE DRAWINGS

FIG. 8 is an image of a document generated by a synthetic document generation pipeline, according to one or more embodiments.

FIG. 10 is an image of a document generated by a synthetic document generation pipeline, according to one or more embodiments.

FIG. 11 is an image of a document generated by a synthetic document generation pipeline, according to one or more embodiments.

DETAILED DESCRIPTION

Figure 1:
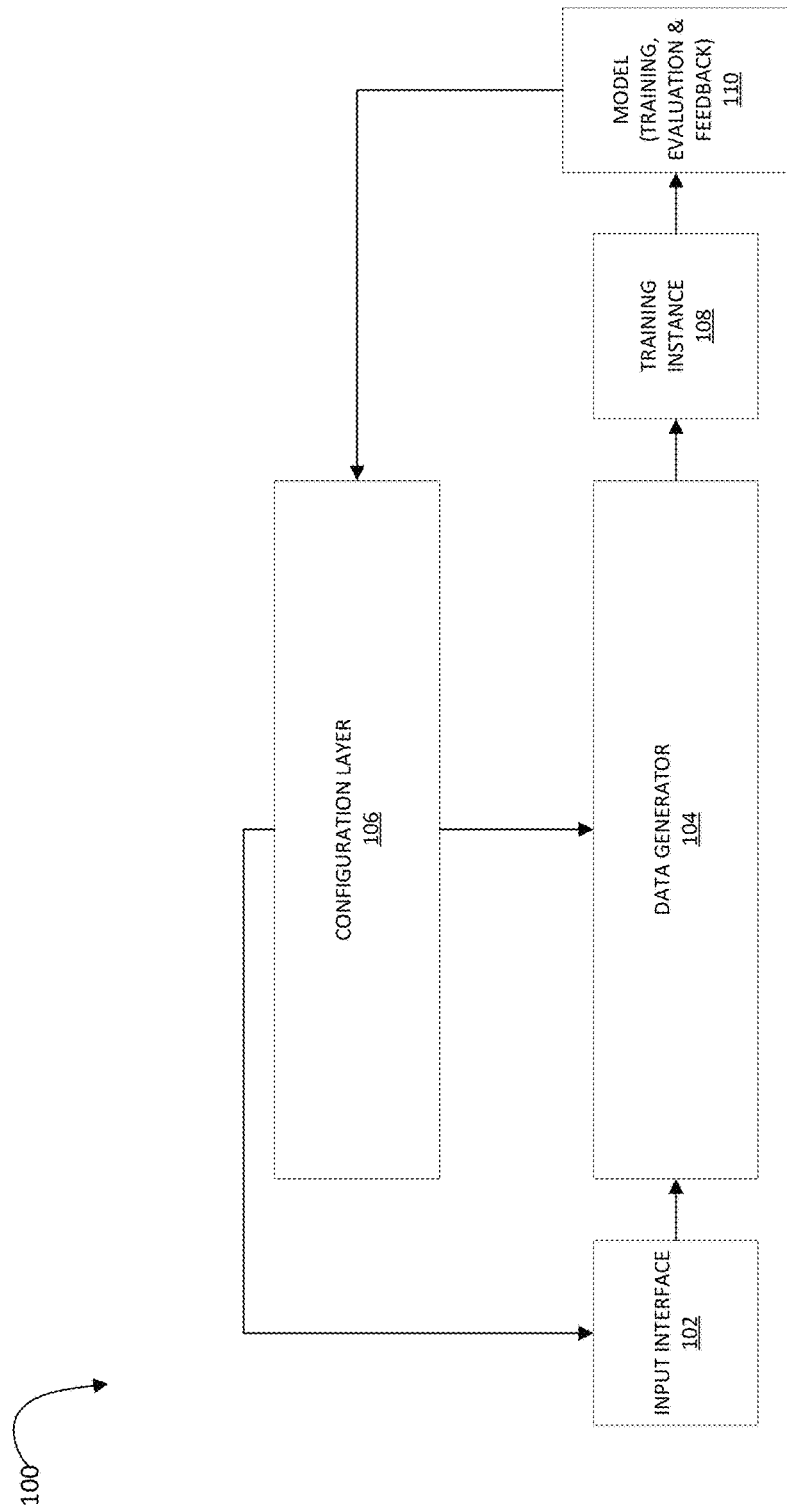
FIG. 1 is an illustration of a synthetic document generation pipeline, according to one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Cloud computing services are being tasked with performing the machine learning-enabled process of data extraction and validation from imaged documents, which may be generated by scanning physical documents or by taking images of physical documents. In other instances, the images can be digitally generated, for example, an online invoice or online form. As a result, document understanding has become important for various industrial use cases. Extracting information from imaged documents and processing the information in a reliable and accurate manner involves solving multiple sub-problems such as: using optical character recognition techniques to extract document contents, key-value extraction, layout parsing, named entity recognition, entity-linking, table parsing and extraction, document image quality assessment, document image classification, machine-readable zone extraction, logo and stamp detection, and others.

More recently, deep learning techniques are being used to confront some of these problems. However, the successful implementation of such deep learning solutions depends upon the rigorous training of the deep learning models, which in turn depends upon the robustness of the training data sets available for the training. However, obtaining robust training data sets is a non-trivial task. There are several problems and limitations associated with obtaining quality training data sets. First, there are a limited number of publicly available training data sets. Many times, the applicability of these training data sets is also limited in scope. In many instances, privately-held training data sets cannot generally be licensed for commercial applications. Additionally, labeling the training data set instances requires manual intervention and is a labor-intensive, tedious, and time-consuming task. Furthermore, each of the above-listed sub-problems can require different training data sets with different labels with variations to account for different objectives, different languages, and document structures.

To address the above-referenced issues, embodiments herein describe a synthetic document generation pipeline for training AI models. A unified training data-generation framework is described that is capable of creating a large volume of training data with labels and annotations in an automated manner. The framework enables a user to have control over the type of training data that is generated. For example, the training data can include synthetically generated documents, and the framework enables a user to control the content (e.g., text, images, handwritten text, background images, different fonts, different languages, etc.) of the documents, and the format/layouts of the documents. The framework can be programmed to further augment the synthetically generated documents with augmentations such as image degradation, text augmentation, and the like, to make the training data more realistic. The framework can also be programmed to check for biases in the generated training data and to automatically take corrective actions to reduce the biases. The framework also automatically generates the associated labels/annotations for the synthetically generated training documents. The framework also enables a user to control the volume (e.g., the number of training data points) of the training data set.

Due to the vast flexibility and control that the framework enables for the generation of the training data sets, the framework is capable of generating different types of training data sets with variations, which can, in turn, be used for training different kinds of models related to the various tasks mentioned above. For example, the synthetically generated training data sets can be used for training various different deep learning models configured for performing different document understanding-related tasks. In other words, the synthetically generated training data sets are enabled for wider usage and are reusable across different machine learning models.

The proposed framework eliminates the need to use separate task-based training data generation tools. The framework provides a one-stop system for generating large volumes of different types of training data in an automated manner, thus reducing the dependency on 3$^{rd}$ party training data vendors and acquisition processes. This enables data science teams to quickly iterate, and prototype different and accurate deep learning models trained using the synthetically generated data without having to worry about how and from where the training data is obtained. The framework also provides fine-grained control over the various aspects of the synthetic training data generation processes. This enables the data science teams to easily and in a quick manner generate training data per their desires and needs. The automated generation of the labels/annotations for the synthetically generated documents helps circumvent the manual processing of annotating documents and thus eliminates the human errors that are typically inherent in the traditional manually driven labeling/annotation process. The automated framework also checks for and eliminates any biases in the generated training data to reduce the risk of training deep learning models that are biased, unfair, and have preference or prejudice against a particular group, individual, or feature.

FIG. 1 is an illustration of a synthetic document generation pipeline 100, according to one or more embodiments. The input interface 102 can receive control instructions from the configuration layer 106 as to which element(s) is to be included in a training instance. The input interface 102 can generate the element (e.g., text, image, QR code, signature) and transmit the element as input data to the data generator 104. The pipeline 100 supports supervised learning and unsupervised learning, and therefore, the input interface can further generate a label for a supervised learning training instance. In some embodiments, the input interface 102 can be a set of individual pluggable interfaces that can each generate different types of elements and respectively transmit the elements as input data for the data generator 104.

The data generator 104 can be a pipeline of modules that can receive the elements and associated labels to generate a document to be used as a training instance 108. For example, the data generator 104 can include a data synthesizer, and augmentation unit, and a data bias and fairness filter. The document can be labeled for a supervised learning training instance or unlabeled for an unsupervised learning training instance. The data generator can receive control instructions from the configuration layer 106 for data generation, augmentation, and filtering to customize the generated training instance to have the appearance of a desired document class. The control instructions can describe a set of desired elements to be included in the training instance 108. The data generator can receive a respective type of data from each interface of a set of interfaces based on the set of desired features to be included in a training instance. The data generator 104 can generate a visual background for the training instance 108. The data generator 104 can further generate a layout for arranging the elements over the background based on a template or template-less format. Upon selecting an arrangement, the data generator 104 can render the document.

The data generator 104 can further augment the rendered document to simulate real-world degradation of the document. The configuration layer 106 can provide control instructions for augmenting various features of the rendered document. The data generator 104 can select from a suite of augmentation techniques. In particular, the data generator 104 can augment the document to simulate various features of the rendered document.

The training instance can be inputted into an algorithm to generate a model 110 for document generation. The generated documents can be visually rich documents (VRD), which are documents that people can recognize based on their visual characteristics, such as a driver's license. The model 110 can be evaluated, and based on the evaluation, the configuration layer 106 can receive feedback. The configuration layer 106 can incorporate the feedback to modify the control instruction to adjust one or more aspects of the model evaluation.

The configuration layer 106 can include a suite of modules for providing control instructions to the data generator 104 for configuring the input data, augmentation of documents, and bias and fairness. The configuration layer 106 can further provide control instructions to the input interface 102 based on training instance-related feedback. A user can input a document class and a number of training instances to be generated, and bias and fairness parameters into the configuration layer 106. The configuration layer 106 can translate the inputs into control instructions for the input interface 102 and the data generator 104.

The configuration layer 106 provides the user the flexibility to customize the training instance 108. Certain artificial intelligence (AI) models are configured to receive and process certain types of data. For example, certain AI models can receive and process image data, while other models can receive and process textual data. The configuration layer can generate control instructions such that the data generator 104 receives elements and labels that are appropriate for a target AI model.

Figure 2:
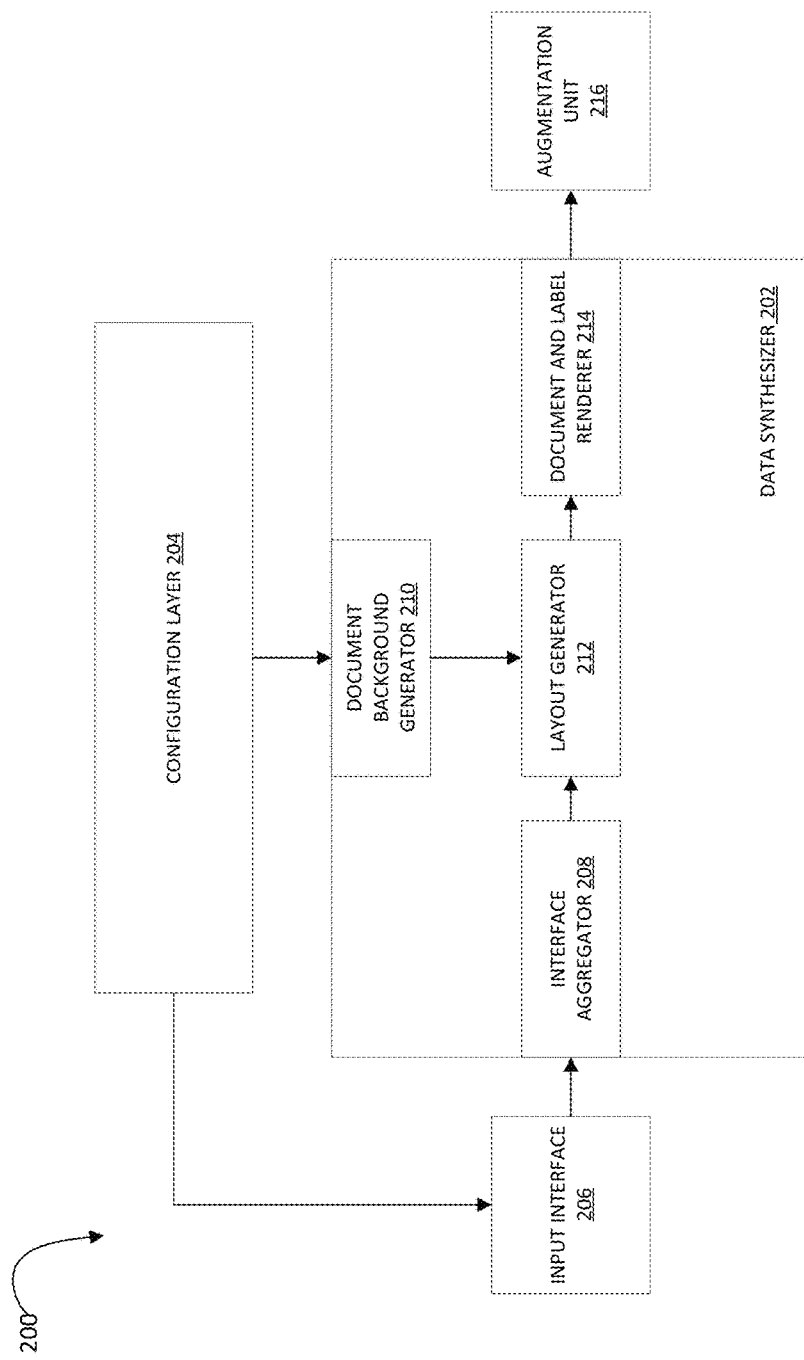
FIG. 2 is an illustration of data synthesizer of a synthetic document generation pipeline, according to one or more embodiments.

FIG. 2 is an illustration 200 of data synthesizer 202 of a synthetic document generation pipeline, according to one or more embodiments. The data synthesizer 202 includes four sub-modules: an interface aggregator 208, document background generator 210, layout generator 212, and a document and label renderer 214. The input interface 206 can receive control instructions from the configuration layer 204 for a user-specified task, which includes input interfaces/elements to be used in the document to be generated. The interface aggregator 208 can further receive control instructions for a layout and to incorporate all elements within a single document. The interface aggregator 208 can receive data (e.g., elements and labels) from the input interface 206, pursuant to control instructions. The interface aggregator 208 can use the data to initialize a document class, which is a respective virtual placeholder for each synthetic document to be generated for the task. The document class can further include a type of document to be generated and a number of documents to be created. For example, if the task calls for one hundred thousand documents to be generated, one hundred thousand instances of the document class can be initialized, where each instance includes each of the elements (e.g., text, images, faces, signatures as configured) required for the document to be generated. The interface aggregator 208 can further combine two or more elements received from the input interface 206 to introduce variation in the document to be created. For example, the document class can be a driver's license and the elements can be an image, text, and a signature. The configuration layer 204 can transmit control instructions that identify the document class (e.g., driver's license), elements (e.g., image, text, signature), and metadata to configure the elements to the document class. The input interface 206, which can include a set of interfaces, can generate an image, text, and a signature appropriate for a driver's license. For example, the image can be a facial image, the text can be identifying information, and the signature can be a handwritten signature.

The document background generator 210 can create different document canvases, (e.g., size, resolution, etc.) and textures for the document background to resemble a real-world background. The document background generator 210 can receive control instructions from the configuration layer 204 for the document dimensions canvas to create a document background. The document background generator 210 can create a background to be incorporated into a document based on the control instructions. For example, the document background generator 210 can receive control instructions and create a background to resemble a real-world background, such as folded, crumbled, or smudged paper.

The layout generator 212 can receive the instances generated by the interface aggregator 208 and the background generated by the document background generator 210. The layout generator 212 can further determine whether the layout is to be a template-based layout or a template-less layout. The layout generator 212 can check the document class instance to determine whether a template has been included or not. The template can include a layout and a structure of the document. The template can include metadata describing an arrangement for each element associated with the document class. For example, if the document class were for a driver's license, the layout could include an image arranged on the left-hand side, personal information arranged to the right of the image, and a signature below the image. If the document class does not include a configured template, the layout generator 212 can be configured to create a layout based on various techniques.

One technique for a template-less layout that can be used by the layout generator 212 is a non-overlapping technique. To implement the non-overlapping technique, the layout generator 212 can take each of the elements associated with the document class and arrange the elements of the background such that no two elements overlap each other.

Another technique for a template-less layout that can be used by the layout generator 212 is a historical knowledge-based technique. The layout generator 212 can be configured to use the layout information of the real and synthetic documents previously acquired/generated by the pipeline 100. The layout generator 212 can analyze the layout of the synthetic documents and combine layout information from different documents across various domains, vendors, demographic origins of documents, and time frames. The layout generator can receive these layouts via an interface, such as a layout interface on the input interface 206. The layout generator 212 can select different layout elements and combine the elements in a manner to keep consistency in the new layout. The layout generator 212 can combine layout elements from different layouts in a constrained manner to ensure that the new layout has a high similarity score (>70% and <90% [configurable]) with the historical layouts from which the layout elements were selected. Thus, the layout generator 212 can generate a new document layout (template), which can be stored and retrieved later for use as a template for the document class for future tasks.

Yet another technique for a template-less layout that can be used by the layout generator 212 is a machine learning (ML) technique. The layout generator 212 can be configured to use or more ML models (GANs) that are trained to recognize and generate layouts. The ML model's output can provide layout information that is different from the layout of any of the documents on which it was trained, thus providing diversity in the training data. Thus, the layout generator 212 can generate, via the ML model, a new document layout, which can be stored and retrieved later for use as a template for the document class for future tasks.

The document class can be a type of document that is to be generated. The document class and elements are selected by a user, and the configuration layer 204 translates the selections into control instructions and transmits the control instructions to the data synthesizer 202. Based on receipt of the control instructions, the data synthesizer 202 can be tasked by generating a document of a particular class and including particular elements.

In addition to the layout, the layout generator 212 can generate associated labels for the document's layout and visual information. The above-described input interface can generate labels that describe a context of an element. The layout generator 212, on the other hand, can generate labels that describe an arrangement and visual characteristics of the elements. The document and label renderer 214 can use the labels generated by the layout generator 212 to render the document.

The document and label renderer 214 can receive the document class instances generated by the interface aggregator 208, including the background information generated by the document background generator 210 and the layout information generated by the layout generator 212. The document and label renderer 214 can use the document class instance to render the synthetic documents. The number of synthetic documents is based on the number of documents indicated by the control instructions from the configuration layer 204 describing the task. The document and label renderer 214 can render the document image by arranging all of the elements received from the input interface 206 based on the template information received from the layout generator 212. The elements can further be arranged over the background information received from the document background generator 210.

The document and label renderer 214 can receive control instructions for the configuration layer 204 as to the configurations of the documents to be generated. The control instructions can be received by one or more modules of the data synthesizer 202. The control instruction can include configuration for a task (e.g., key-value extraction (KVE) entity linking (EL), name entity recognition (NER), document image quality assessment (DIQA)) for which a document is to be generated, including an output data format type. The document and label renderer 214 can also render the document in HTML, XML, and Text formats (e.g., .txt, .xlsx, .pdf, .docx, etc.) based on the task requirement. Along with the renders, the document and label renderer 214 can also generate the labels that are used for supervised training ML models. In some embodiments, the document and label renderer 214 can add slight variations in the template and placement of the elements in the document being generated. This ensures that though the documents follow a template, there are variations between each document of the same template.

The data synthesizer 202 can further receive control instructions for the configuration layer 204 as to the configurations of the documents to be generated. The control instructions can be received by one or more modules of the data synthesizer 202. The data synthesizer 202 can further receive control instructions for a character, word, or entity level that data generation is to be carried out. The data synthesizer 202 can receive control instructions for the hardware resources and parallelism to be used during the generation of the document. The data synthesizer 202 can receive control instructions for the number of copies of the document to be created.

The configuration layer 204 can also transmit the control instructions to the input interface, such that the input interface can be instructed to generate the proper elements that are configured for the document class. The input interface 206 can receive the control instructions from the configuration layer 204 and generate one or more elements pursuant to the control instructions. The one or more elements can be configured for the document class. In other words, the input interface 206 can generate elements that are appropriate for the given document class. Therefore, the control instructions can include metadata that includes element parameters that are configured for the document class to guide the input interface 206. In some instances, the input interface can further provide labels describing the elements.

Figure 3:
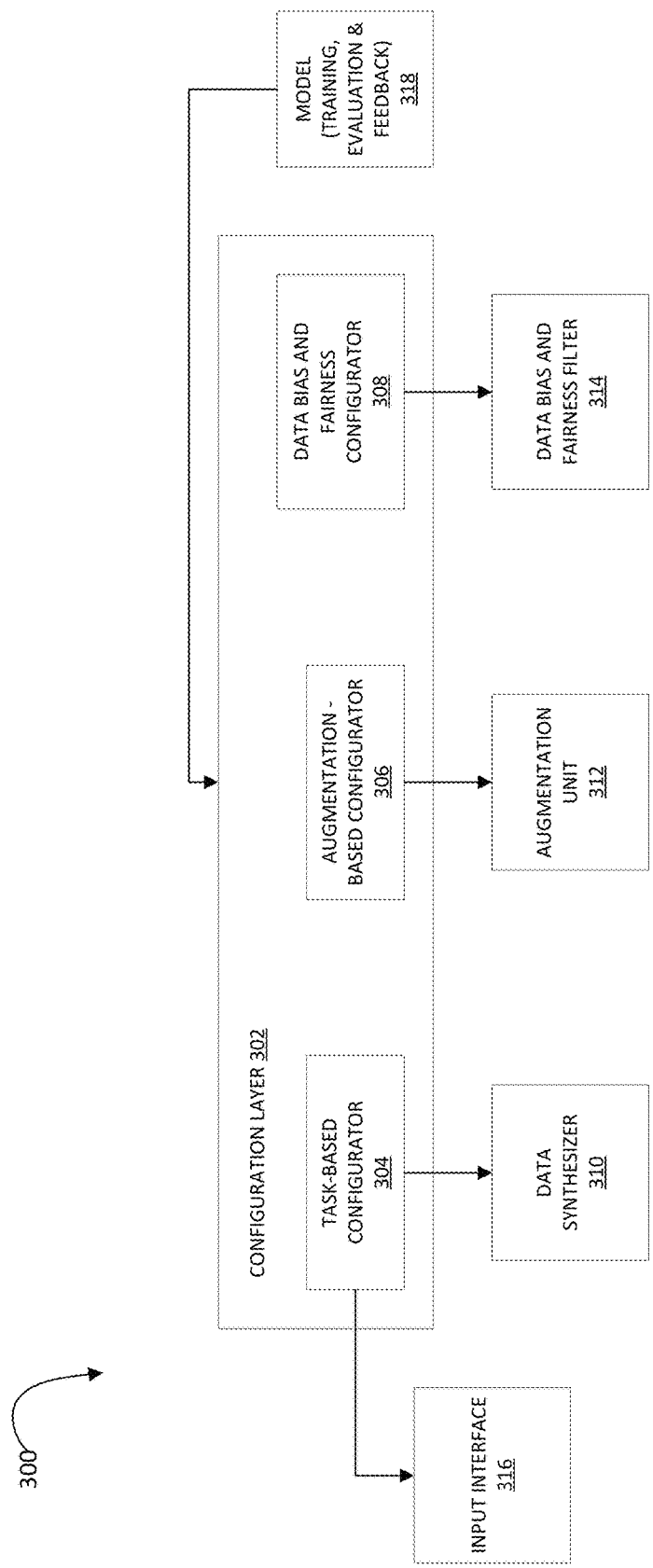
FIG. 3 is an illustration of a configuration layer of a synthetic document generation pipeline, according to one or more embodiments.

FIG. 3 is an illustration 300 of a configuration layer 302 of a synthetic document generation pipeline, according to one or more embodiments. The configuration layer includes three modules: a task-based configurator 304, an augmentation-based configurator 306, and a data bias & fairness configurator 308. Each module can receive inputs establishing parameters for a task and convert the inputs into control instructions for the pipeline 100.

The task-based configurator 304 can act as an initializer for an input interface and a data synthesizer and provide control instructions to both a data synthesizer 310 and an input interface 316. The control instructions to the data synthesizer 310 can include identification of document understanding tasks (e.g., KVE, EL, NER, DIQA, etc.) to be implemented by the model 110 and for which data needs to be generated and output data format type. For example, the task-based configurator 304 can further receive information regarding whether the training instance is intended to be output as an image with text, text only, or an HTML/XML format. The task-based configurator 304 can generate control instructions for the data synthesizer 310 to render documents for the intended format.

As a single generated document can be used to train one or more models for the different machine learning tasks based on the configuration of the training instance. The control instructions to the data synthesizer 310 can further include instructions for whether the document generation is to be carried out at a character, word, or entity level. The control instructions can further include instructions to the input interface 316 as to which input interface(s) is/are to be used for document generation. The control instructions can further include the document dimensions canvas to use to create the document background by a document background generator. The control instructions can further include instructions to a layout generator to incorporate all elements within a single document for document generation. The control instructions can further include instructions to a pipeline as the hardware and parallelism to be sued for document generation. The control instructions can further include instructions for an interface aggregator as to the number of instances to generate.

The augmentation-based configurator 306 can initialize and provide control instructions for various modules of an augmentation unit 312. The augmentation-based configurator 306 can receive an augmentation task from a user and translate the task into the control instructions to guide the various modules to perform their respective tasks. The various modules can receive the rendered documents from the data synthesizer 310, and based on the control instructions, the modules can introduce degradation information to cause the rendered documents to resemble real-world documents that have degraded in one form or another.

The augmentation-based configurator 306 can receive the augmentation task and translate the task to control instructions that initialize the appropriate module(s) and guide the selection of the appropriate techniques to implement to effectuate the tasks. The task can be to augment various aspects of the rendered document. For example, the task can include augmented textual, visual, or graphical aspects of the rendered document. Furthermore, the task can call for the module to select augmentation techniques that are configured for the task. In one example, rendered documents can be augmented to exhibit degradation similar to real-world degradation of a similar real-world document. For example, in the real world, pictures can fade over time, and therefore the augmentation-based configurator 306 can generate control instructions that would cause the module to select an augmentation technique that would cause a picture included in a rendered document to fade. The augmentation-based configurator 306 can receive an indication from a user as to the hardware resources and parallelism to adopt while performing the augmentation. The augmentation-based configurator 306 can further generate control instructions to guide the modules as to the hardware resources and parallelism to incorporate while performing the task based on the user's indication. The augmentation-based configurator 306 can further configure different types of adversarial samples and artifacts to be injected in the training data along with the modality of such artifacts. The adversarial samples and artifacts can be configured to cause a machine learning model to misclassify a training instance leading to an overall robust machine learning model. Since the framework supports multi-modal data generation, the adversarial samples and artifacts can also be multi-modal.

The data bias and fairness configurator 308 can initialize and provide control instructions to a data bias and fairness filter 314. A user can provide data bias and fairness criteria that can guide the generation of rendered documents to be used for a model. The criteria can include, for example, historical distribution data, current distribution data, and projected distribution data. The data bias and fairness configurator 308 can translate the user-provided criteria into control instructions to enable the data bias and fairness filter 314 to identify documents that fall inside or outside of some threshold criteria.

The configuration layer 302 can receive feedback from a model 318 generated during various stages (e.g., training, evaluation, and feedback). The feedback can include information identified by the pipeline 100 through analysis of the documents. For example, the feedback can include comparison information from a statistical analysis of the documents, which identifies an over-representation or an under-representation of a class in the rendered documents. The feedback can further include information identified by user inspection of the rendered documents. The configuration layer can translate either feedback into control instructions for modifying the pipeline 100. Generally, modifying the pipeline to eliminate biases in the rendered documents includes directing one or more interfaces to either generate a greater number of or a lesser number of elements associated with a class. For example, if the model 318 is being generated to identify driver's licenses from across the globe, the feedback may indicate that one global region is being either unrepresented or overrepresented. The configuration layer 302 can transmit control instructions to the input interface 316 to generate images, text, and signatures in a manner to negate the underrepresentation or overrepresentation.

Figure 4:
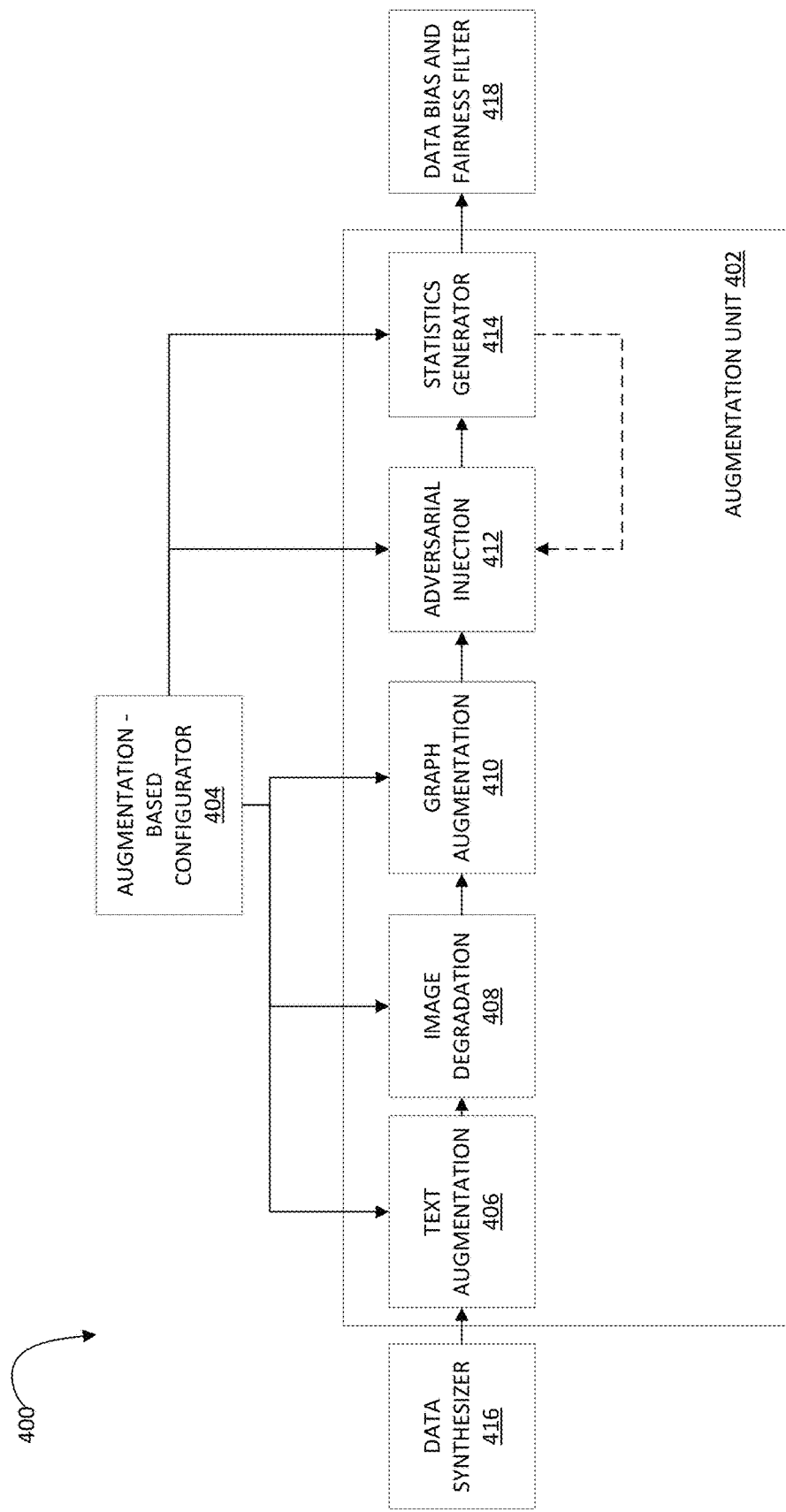
FIG. 4 is an illustration of an augmentation unit of a synthetic document generation pipeline, according to one or more embodiments.

FIG. 4 is an illustration 400 of an augmentation unit 402 of a synthetic document generation pipeline, according to one or more embodiments. The augmentation unit 402 can include a set of modules for augmenting a rendering document to visually resemble a real-world document. A user can select a target augmentation of a rendered document and input the selection into an augmentation-based configurator 404. The augmentation-based configurator 404 can, in turn, translate the selection in control instructions and transmit the instruction to one or more of the modules. The modules can include text augmentation 406, image degradation 408, graph augmentation 410, adversarial injection 412, and statistics generator 414.

The text augmentation 406 is a module that can receive control instructions for augmenting the text of a rendered document. The rendered document can be received from a data synthesizer 416 and pursuant to a user-defined task to generate training instances for an ML model. The control instructions can guide the text augmentation 406 to create a replica of the rendered document and add noise or variations in the text of the replica to create more realistic document content. For example, the text augmentation 406 can jumble the characters in a word or add common spelling errors to the text of the replica. The end of effect is that there are two rendered documents, one without the addition of noise or variations from the text augmentation 406, and a replica with added noise or variations. The text augmentation 406 can primarily be focused on text-based augmentation and can integrate various libraries (e.g., NLPaug) to achieve augmentation.

The image degradation 408 is a module that can receive control instructions from the augmentation-based configurator 404 to create a replica of a rendered document and apply various image-based data augmentation techniques that make the rendered document appear more realistic. This diversifies a training data set to enable better training of an ML model. The image degradation 408 can implement pixel-based degradation and spatial-based degradation. Pixel-based degradation affects the pixel color and intensity of the image, giving a different view but with the same orientation, like change in hue, saturation, contrast, etc. Spatial-based degradation affects the orientation of the image, like the angle of rotation, perspective, etc.

Figure 7:
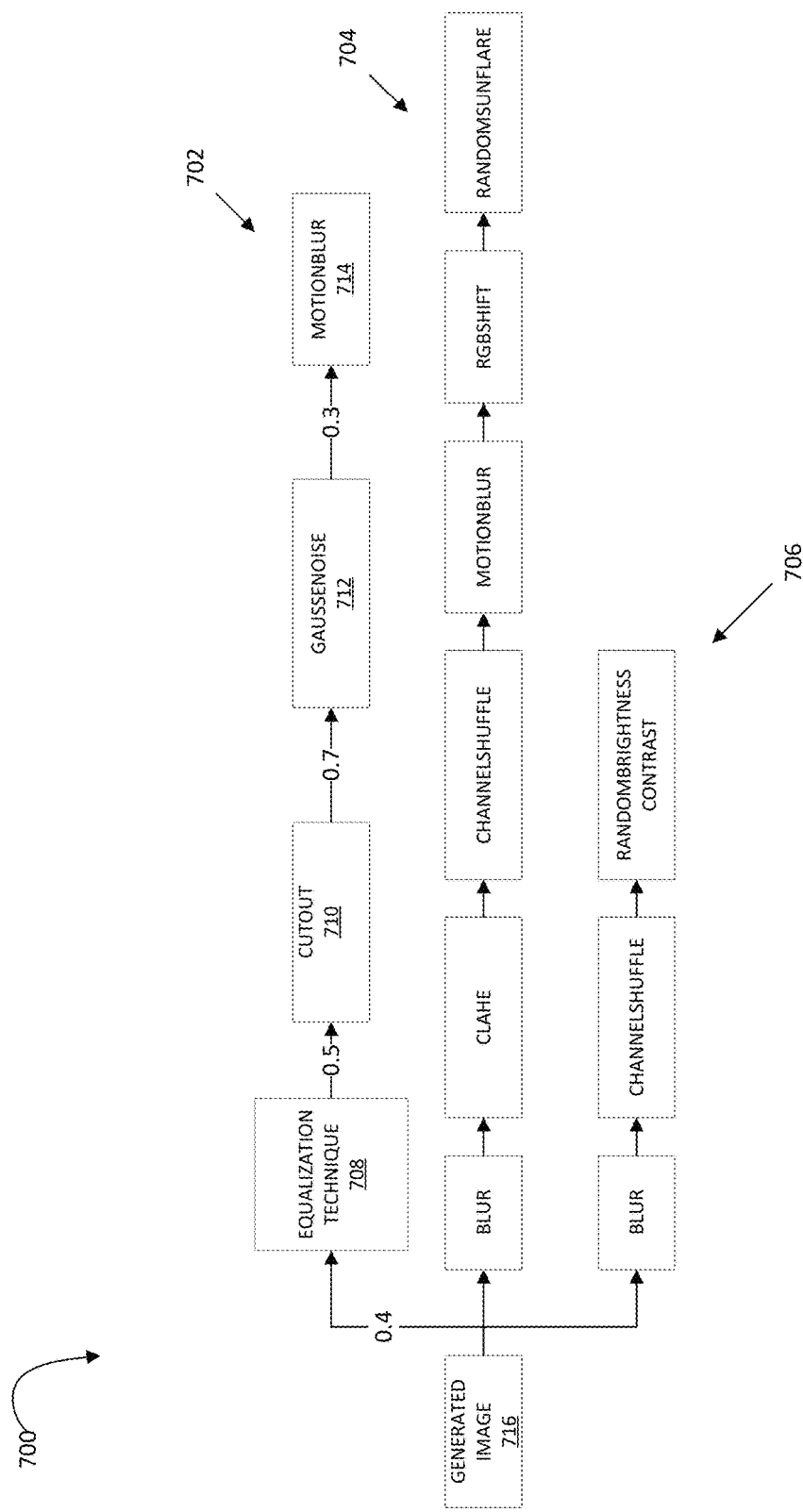
FIG. 7 is an illustration of image degradation pipelines for a synthetic document generation pipeline, according to one or more embodiments.

The augmentation unit 402 can be extensible and can add additional modules for text or image augmentation as needed for different use cases. Both the augmentation modules are configured with a probability of applying the augmentation. FIG. 7 illustrates three pipeline examples of pixel-based image degradation with the probability of various augmentations. The probabilities of individual degradation blocks are configurable, along with creating and integrating new pipelines into the framework.

The graph augmentation 410 is a module that can receive control instructions from the augmentation-based configurator 404 to create a replica of a rendered document and apply various augmentation techniques on a graph that make the rendered document appear more realistic. The graph augmentation 410 can pass the rendered document's graph through multiple graph augmentation processes to create additional replica documents, which are structurally different. For example, augmentation processes can include selective node & edge pruning, node shuffling, altering node and edge characteristics by changing word sizes in the annotation, or re-weighting the edges. The graph augmentation 410 can be extensible and can add additional modules for graph augmentation as needed for different use cases. For instance, documents can include one or more graphical elements like barcodes, QR codes, holograms, stamps, logos, tables, infographics, charts, diagrams, etc. An interface of the input interface can be scaled and configured to include multiple graphical elements while generating documents. The graphical element can be passed through the graph augmentation 410 to create similar documents that are structurally different.

The adversarial injection 412 is a module that can receive control instructions from the augmentation-based configurator 404 for introducing adversarial samples and artifacts into the training data. Machine learning models can be prone to various security threats which compromise their performance and usage. Attackers can use various techniques like data poisoning, evasion attacks, adversarial attacks to compromise the intend use of the model by shifting their classification boundaries or attacking the gradient pockets of linearity. An adversarial sample can be an input that has been modified to cause a machine learning model to misclassify the input. For example, noise can be introduced to the input to generate a new input that can cause the machine learning model to misclassify the new input. In some instances, the added noise can be imperceptible to a human. The adversarial injection 412 can be used to train machine learning models which are robust to such malicious inputs and distribution of data. Training data with a wider distribution, reduces the risk of such instances for a machine learning model failure. The adversarial injection 412 can modify the input data, merge multiple data samples, add distribution noises, add additional classes, include outliers in the sample, etc. Apart from increasing the data distribution with more examples and adding invisible noise (not perceptible by humans), the adversarial injection 412 can reduce the low probability pockets of the classes generated in the data with the help of the statistics generator 414. The adversarial injection 412 can eliminate the low probability classes, and then pass the data to the statistics generator 414 to re-evaluate the data composition and statistics. The statistics generator can further provide feedback to the adversarial injection 412. If the statistics generator's feedback indicates that the data composition and statistics are below user-defined threshold, the adversarial injection 412 can re-compose the data accordingly to lower the risk of attacks. If the statistics generator's feedback indicates that the data composition and statistics are above user-defined threshold, the adversarial injection 412 can elect to not re-compose the data. As the framework supports multi-modal data generation, the adversarial samples and artifacts can be multi-modal.

The statistics generator 414 is a module that can receive control instructions from the augmentation-based configurator 404 to calculate statistics from the rendered documents, including the replicas of the rendered documents. A layout generator in conjunction with a task-based configurator can provide the number of classes and modality to be represented in a set of training instances. The statistics generator 414 can analyze the rendered documents to calculate a class (label) distribution and item distribution. This information can be compiled into a report for a data science team to better understand the generated dataset that will be used for training machine learning models. The statistics generator 414 can further generate statistics that can be fed back into a configuration layer to generate new control instructions to modify the generation of rendered documents. Based on the class distribution, better decisions can be made while choosing loss function or optimizers required to train an ML model. The statistics generator 414 can be further extended to generate more insights about the data as required by the data science team. As indicated above, the statistics generator 414 can further provides feedback to the adversarial injection 412 regarding low probability pockets in the generated data which have higher risk of attacks. The feedback can enable the adversarial injection 412 to re-compose to the generated data along all the modalities to reduce the risk of machine learning model attacks.

The data bias and fairness filter 418 can be a module that can evaluate the rendered documents, including replicas, in various slices and calculate distribution statistics to identify and filter any sources of bias that can influence the machine learning model to favor or discriminate any particular group, individual, or feature. Practically speaking, the sources can be one or more interfaces of an input interface. Based on the input data received from the input interface, different types of biases get incorporated into data due to existing biases, circular dependencies in features, selection and sampling processes, data collection processes, etc. The data bias and fairness filter 418 can attempt to identify and eliminate these biases in the data by via a task-based configurator, data distribution from the statistics generator 414, and the rendered documents. The data bias and fairness filter 418 can check and evaluates the rendered documents with biases so that the ML model is trained following responsible AI guidelines and does not discriminate or make unfair predictions. The data bias and fairness filter 418 can act as a quality gatekeeper to prevent a biased training data set from being used to train an ML model. If any biases are found in the data, a configuration layer can update the control instructions to an input interface and data synthesizer to tune the data generation process to eliminate bias. The data bias and fairness filter 418 can also eliminate/reduce the generated data size to eliminate any biases before making it available for training of an ML model.

Figure 5:
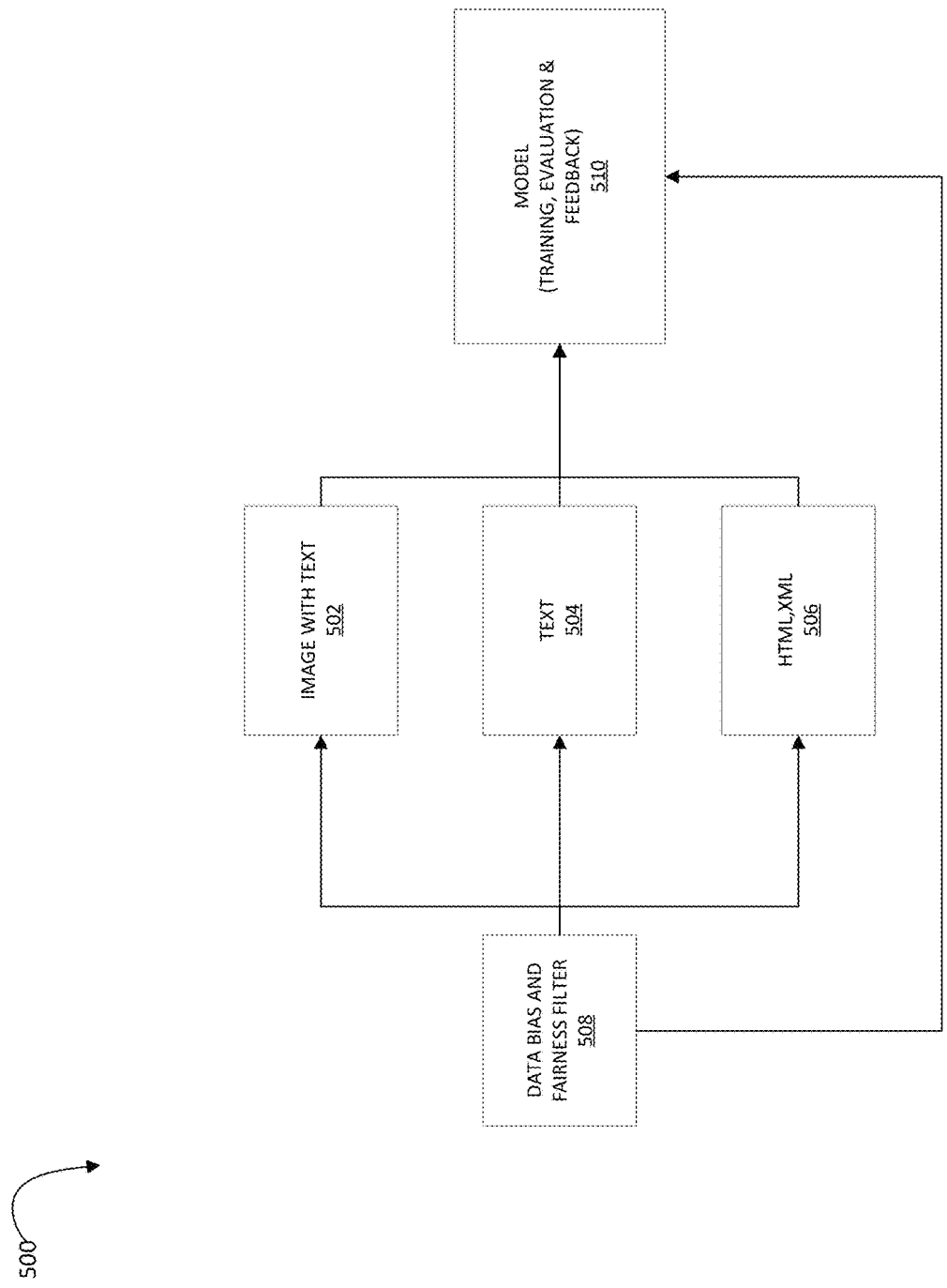
FIG. 5 is an illustration of various training instances generated by a synthetic document generation pipeline, according to one or more embodiments.

FIG. 5 is an illustration 500 of various training instances generated by a synthetic document generation pipeline, according to one or more embodiments. The training instances can assume various formats based on the requirements of the task and/or an ML model. As illustrated, three candidate formats are shown, an image with text 502, text 504, and Hypertext Markup Language (HTML)/eXtensible Markup Language (XML) 506. The image with text 502 can be a training instance that includes image and text. For example, a rendered document in a format of time with text 502 can include a resume with an image of a job candidate. A rendered document in a format of text 504 can include a form, such as an insurance waiver or corporate resolution. A rendered document in the format of HTML/XML 506 can be, for example, a webpage. It should be appreciated that the in real-world use cases training instances can include additional formats as required by a task and/or an ML model. The additional formats can be formats that are not illustrated in FIG. 5.

The data bias and fairness filter 508 can receive a rendered document as a training instance from an augmentation unit of a data generator and perform a statistical analysis for bias and fairness prior to the rendered document reaching the model 501. The data bias and fairness filter 508 can further transmit the training instance to the model. As illustrated, the training instance can assume various formats as required by a task or ML model. It should be appreciated that framework is configured to reduce the risk of adversarial attacks and data biases in the model by filtering and re-composing the data.

The model 510 can be trained to perform various tasks. The training instances can include elements, a layout, and a format that are configured toward training the model as to the task. The task can include, for example, key value extraction (KVE), named entity recognition (NER), optical character recognition (OCR), visual question and answering (VQA), layout parsing, entity learning (EL), table parsing and extraction, digital image correlation (DIC), document image quality assessment (DIQA), and machine-readable zone extraction (MRZE). The pipeline can be configured to generate training instances for each of these tasks and others. As described above, the pipeline allows for the configuration of input elements, layout format, and augmentation. Therefore, regardless of the machine learning task, the pipeline can be configured to generate a training instance suitable for training an ML model to perform the task. The generated training instance can further be used for training different ML models that are configured to perform different tasks. Therefore, the generated training instances can be reusable across different ML models that are configured for different tasks.

Figure 6:
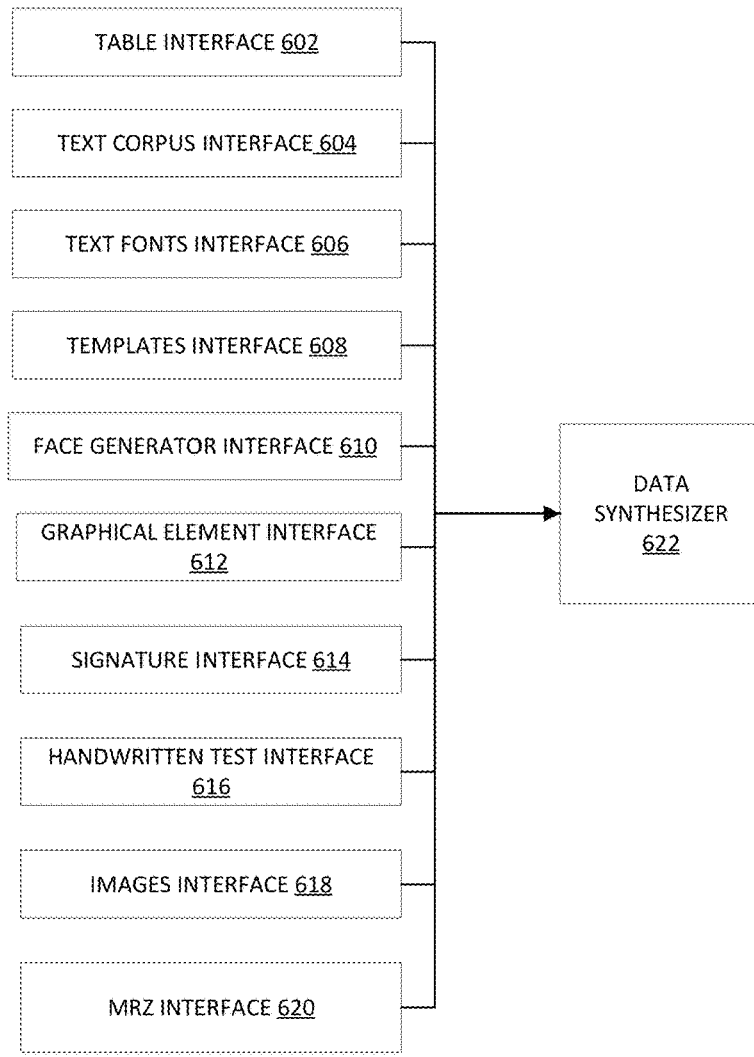
FIG. 6 is an illustration of input interfaces for a synthetic document generation pipeline, according to one or more embodiments.

FIG. 6 is an illustration 600 of input interfaces for a synthetic document generation pipeline, according to one or more embodiments. Each of the below interfaces can provide a different type of data based on an element to be included in a training instance. As illustrated, FIG. 6 includes ten interfaces, however, in a real-world application, the number and type of interfaces that are integrated into the pipeline are user-configurable. A user desiring training data can select a document class and target elements to include in a training instance, and these selections can be translated by a configuration layer into control instructions which can be received by one or more interfaces that can output the target elements. Based on the user's selection, one or more interfaces can be removed from the interfaces integrated into the pipeline, or one or more interfaces can be extended to new types of elements.

As mentioned above, the pipeline can be configured to generate the training instance as a supervised learning training instance or an unsupervised learning training instance. Therefore, in addition to extracting elements from the input data, the interfaces in a supervised learning context can extract a label from the input data. The labels can be descriptions of the content associated with the element. For example, if the element is an image, the label can be a description of the subject of the image. If the element is text, the label can be the description of the subject of the text. For an unsupervised learning scenario, the interfaces can provide the element without a label. For example, the interface can provide an image or text without any label describing the subject of the image or text.

The following is a brief description of the interfaces illustrated in FIG. 6. The table interface 602 can be used to generate table elements, such as rows, columns, and cells for inclusion in a document. The table interface 602 can further generate spatial and textual information. The spatial information can include a label describing a spatial layout of the table elements. The textual information can include a content included in one of the table elements.

The text corpus interface 604 can provide text for inclusion in a document. The interface can generate multi-lingual language corpus for providing text to include in a document generated by the pipeline. For example, a user may wish to create training instances of documents that resemble a real-world form (e.g., an invoice, medical chart, insurance form, identification card). The configuration layer can provide control instructions to the text corpus interface 604 to generate text to include in the form. The text corpus interface 604 can generate the text pursuant to the control instructions. The text can be generated by retrieving text from various sources, such as website pages, electronic books, database tables, transformer-based language models (e.g., Bidirectional Encoder Representation from Transformers "BERT").

The text fonts interface 606 can provide fonts that can be used for text included in a generated document. In some instances, the text fonts interface 606 can provide multiple fonts, character sizes, and colors. The text fonts interface 606 can provide variations in font design, size, color, and other visual properties for document generation. In some instances, a machine learning model that can generate new fonts can be integrated with the text fonts interface 606 to create new fonts or mimic new fonts created in the real world.

The text fonts interface 606 can integrate different documents layout for document generation. For example, a user can select the generation of documents that resemble a real-world document. The text fonts interface 606 can provide a layout for the arrangement of elements on the documents. For example, a user can direct the pipeline to generate documents that resemble tax forms. The configuration layer can generate control instructions to provide a layout for the arrangement of elements to cause a document to resemble a real-world tax form.

The face generator interface 610 can generate facial images to be included in a generated document. Many documents (e.g., driver's licenses) require facial images, and for privacy concerns, it can be beneficial to create facial images of non-existent people. The face generator interface can generate facial images of non-existent people. For example, the face generator interface 610 can be implemented by generative adversarial networks (GANs) and generate images of non-existent people.

The graphical element interface 612 can generate one or more graphical elements for inclusion in a generated document. For example, the graphical element interface 612. In some instances, the graphical element interface 612 can include a set of generators where each generator is configured to generate a different element. One or more of the generators can be implemented as machine learning models to increase the diversity of the elements. The elements can include, for example, barcodes, QR codes, holograms, stamps, logos, tables, infographics, charts, or diagrams.

The signature interface 614 can generates signatures to be included in a generated document. The signatures can be pre-existing signatures or generated from various sources. For example, images of pre-existing signatures can be retrieved from a database or new signatures can be computer-generated, such as by a machine learning model.

The handwritten test interface 616 can integrate deep learning models (e.g., GANs), that can be trained to generate handwritten text for a given text corpus. The handwritten text can be based on a target generated document. For example, a user can direct the pipeline to generate documents that resemble physician's notes for electronic health records (EHR) scanning. The configuration layer can generate control instructions to provide a handwritten text to resemble a physician's notes. This enables realistic document creation that resembles real-world documents.

The images interface 618 can be used to modify a background of a document being generated. The images interface 618 can provide or generate images using a color platelet for documents that are generated on non-white background pages or letterheads.

The machine-readable zone (MRZ) interface 620 can generate a MRZ for a document to be generated. The MRZ is an area of a document that includes codified elements that are readable by a machine.

Each of the interfaces of the input interface can further be configured to transmit elements and labels to a data synthesizer 622 for the generation of a rendered document.

FIG. 7 is an illustration 700 of image degradation pipelines for a synthetic document generation pipeline, according to one or more embodiments. As illustrated, a first pipeline 702, a second pipeline 704, and a third pipeline 706 are shown. Each block of each pipeline can be an image-degradation technique that can be applied to a generated image. The first pipeline 702 further includes the probability of application of the block. For example, the probability an equalization technique 708 will be applied in the first pipeline 702 is 0.4. It should be appreciated that the second pipeline 704 and the third pipeline 706 also include probabilities, but for brevity only the probabilities for the first pipeline are illustrated.

A user can select one or more target degradations of the rendered document. A configuration layer can translate the target degradations into control instructions and transmit the instructions to an augmentation unit. An augmentation unit can receive a rendered document that includes an image from a data synthesizer and control instructions from a configuration layer. Based on the control instructions, the augmentation unit can develop a pipeline to effectuate the instructions. The augmentation unit can process the image through the pipeline to augment the rendered document.

For purposes of description, the first pipeline 702 is described. The first pipeline 702 can include four blocks, equalization technique 708, cutout 710, a gausenoise (Gaussian noise) 712, and motion blur 714. The augmentation unit can process a generated image 716 through the first pipeline 702 to introduce noise and degrade the image such that the image appears as a degraded real-world image. The augmentation unit can process the generated image 716 through the block for equalization and adjust the contrast of the image by adjusting a histogram of the intensity values for the generated image 716. The augmentation unit can further process the generated image through a block for cutout 710. Through this block, the augmentation unit can remove an object in the generated image 716 and replace the object with a monochromatic background. In some embodiments, the augmentation unit can remove the object and leave a background generated by a document background generator. The augmentation unit can further process the generated image through a block for gausenoise (Gaussian Noise) 712, in which the generated image 716 can be degraded based on the introduction of a statistical noise having a probability density function equal to a normal distribution. The augmentation unit can further process the generated image 716 through a block for motionblur (Motion blur), in which the image can be blurred through the introduction of a Gaussian spread function.

The augmentation unit can then transmit the rendered document with the degraded image to a data bias and fairness filter for performance of a statistical analysis as described above.

FIGS. 8-13 are images of various documents that can be generated by the herein described pipeline. The documents are examples and should not be considered as an exhaustive list of documents that can be generated by the pipeline illustrations of the documents. A user can generate training instances for various machine learning tasks, and the pipeline can be configured to generate customized training instances for each of these tasks.

Figure 8:
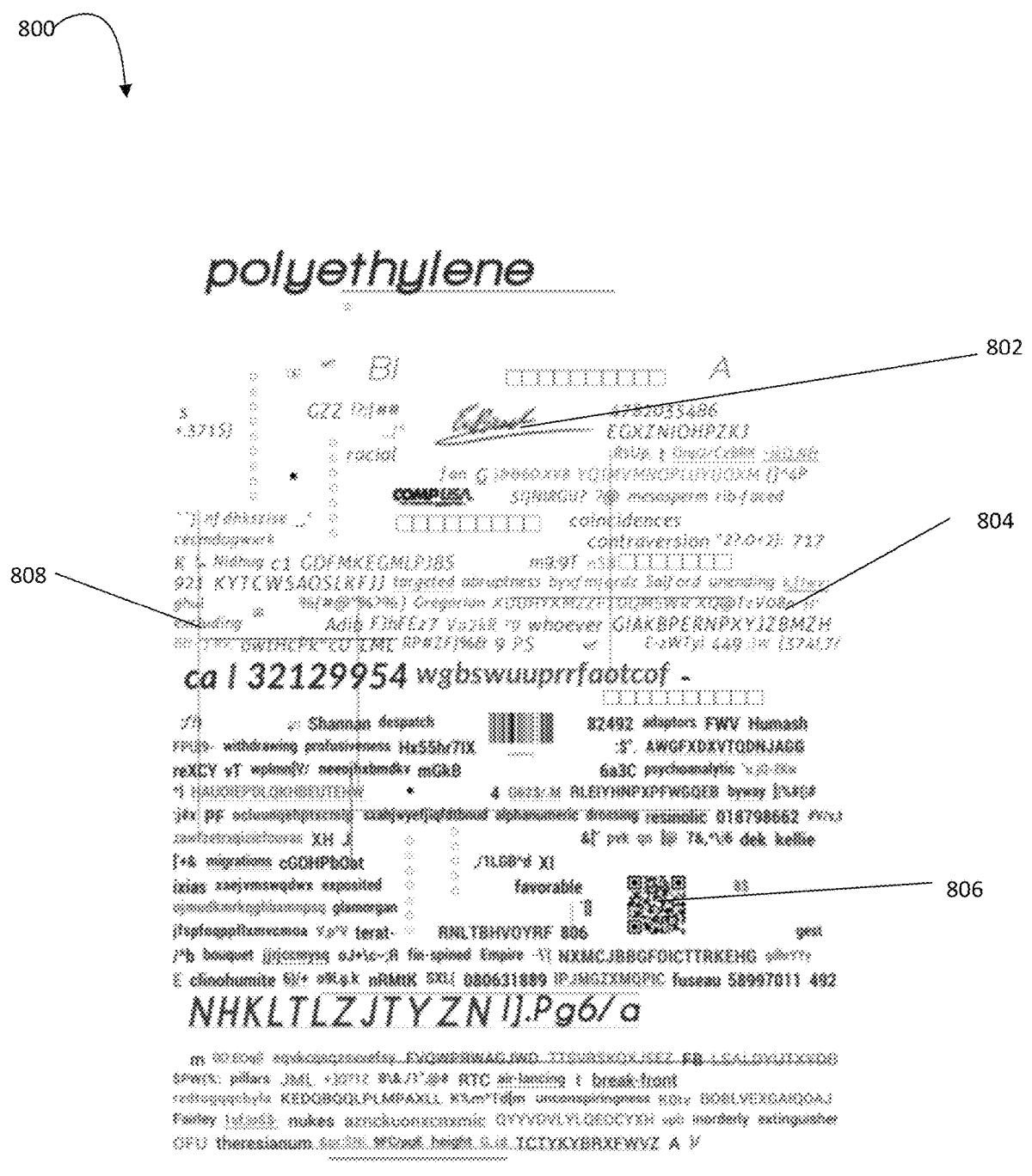

FIG. 8 is an image of a document 800 generated by a synthetic document generation pipeline, according to one or more embodiments. The document 800 can be generated as a template-less document by a data synthesizer and augmented by an augmentation unit. using a non-overlapping placement of a signature 802, a text 804, and a machine-readable visual code 806. As illustrated, an input interface (e.g., input interface 102) has generated a signature 802 to resemble a handwritten cursive signature. Additionally, an input interface has generated text 804 in different alphanumeric characters having different fonts and sizes. Yet another input interface has generated a machine-readable visual code 806 that resembles a visual bar code. In some embodiments, the document 800 can include real-world images, such as faces, pictures, corporate logos, cartoons, graphs, etc. The document 800 has further been augmented by an augmentation unit (e.g., augmentation unit 402) to introduce a degradation in the form of visual crease lines 808 in the document 800.

Figure 9:
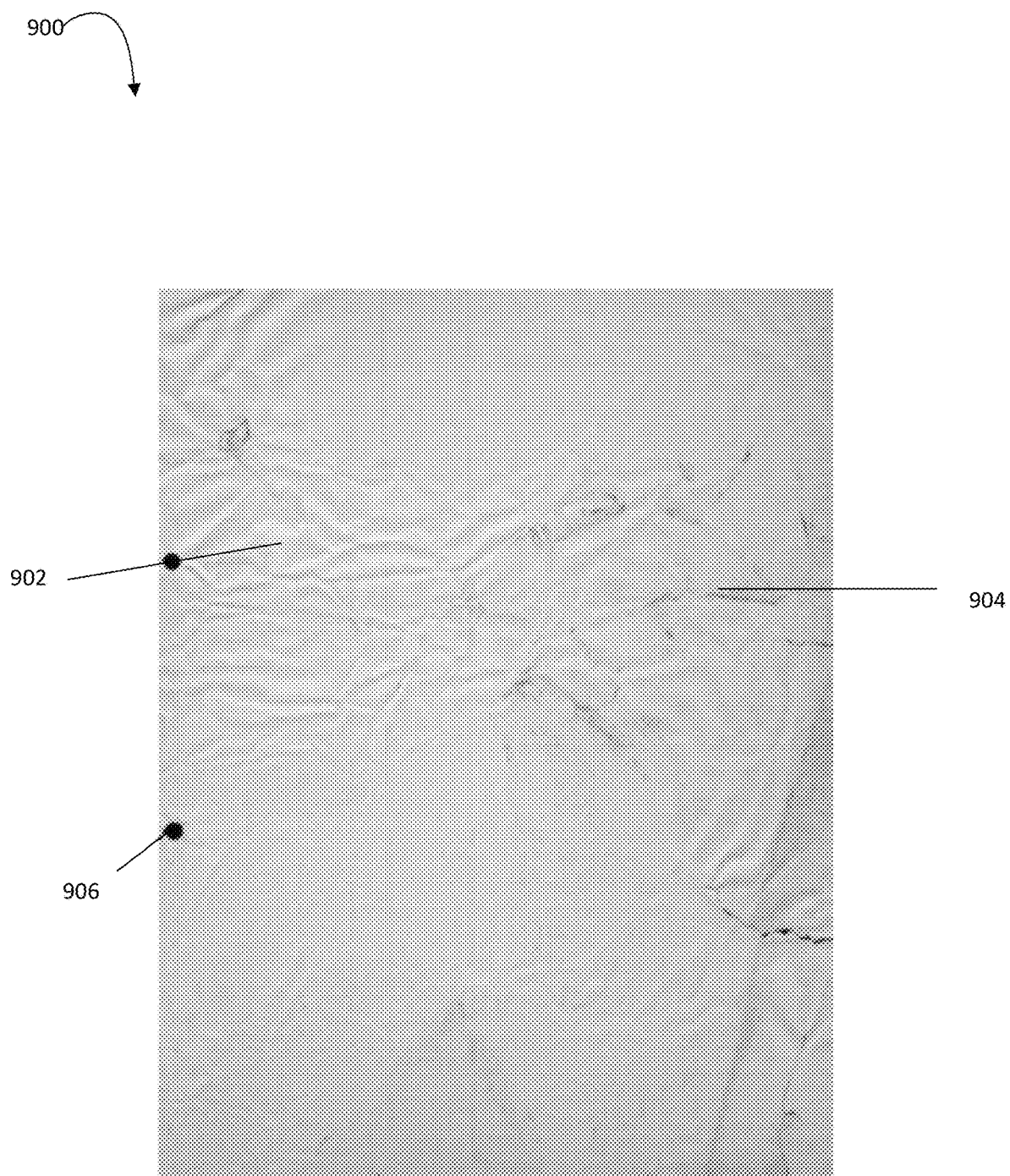
FIG. 9 is an image of a document background generated or utilized by a synthetic document generation pipeline, according to one or more embodiments.

FIG. 9 is an image of a document background 900 generated by a synthetic document generation pipeline, according to one or more embodiments. As seen, a document background generator (e.g., document background generator 210) has generated a background resembling a blank piece of paper. The document background 900 has further been augmented to introduce a degradation in the form of crumpling 902, smudge marks 904, and hole punching 906.

Figure 10:
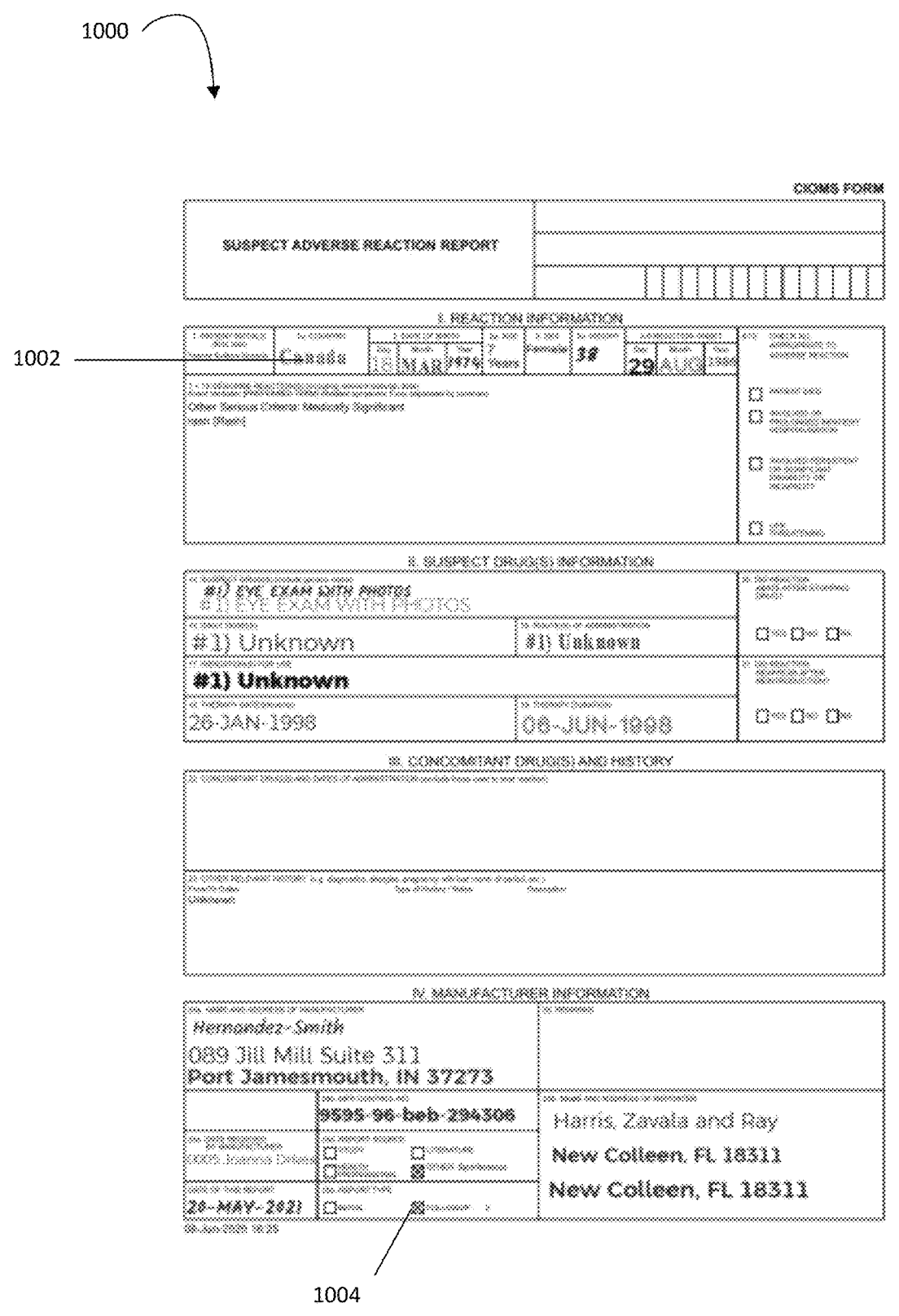

FIG. 10 is an image of a document 1000 generated by a synthetic document generation pipeline, according to one or more embodiments. The document 1000 can be generated by the application of a template. As seen, the elements in the document 1000 can be arranged in a layout according to a layout template. In this image, the document resembles a real-world suspect adverse reaction report (e.g., document class). The template includes a section for reaction information, suspect drug(s) information, concomitant drug(s) and history, and manufacturer's information. A synthetic document generation pipeline (e.g., pipeline 100) can populate each section with elements received from an input interface (e.g., input interface 102). As seen, the sections have been populated with text 1002 configured to match subsections. For example, the section for "country" includes the text "Canada". The text 1002 is provided in different sizes and in different fonts. Additionally, the pipeline can populate a subsection with an image 1004. In this example, the "report type" subsection is populated with a visual "x" like image.

Figure 11:
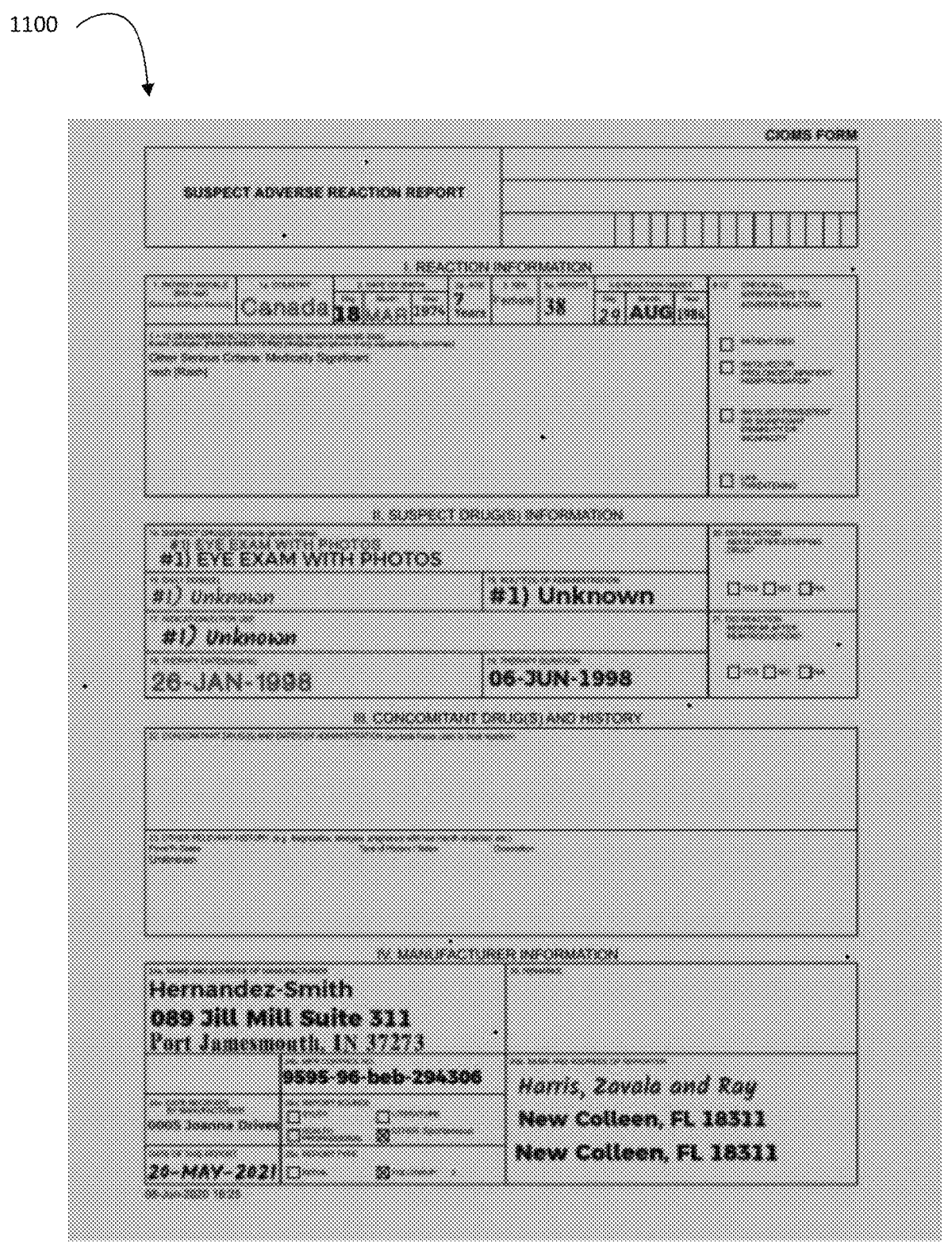

FIG. 11 is an image of a document 1100 generated by a synthetic document generation pipeline, according to one or more embodiments. In particular, FIG. 11 is an image of the same document 1000 as provided in FIG. 10. FIG. 11 differs from FIG. 10 in that the background in FIG. 11 is a different background than the background in FIG. 10. In particular, the background in FIG. 11 is different than the background in FIG. 10. FIG. 11 also differs from FIG. 10 in that the text fonts in FIG. 11 are different from the text fonts in FIG. 10.

Figure 12:
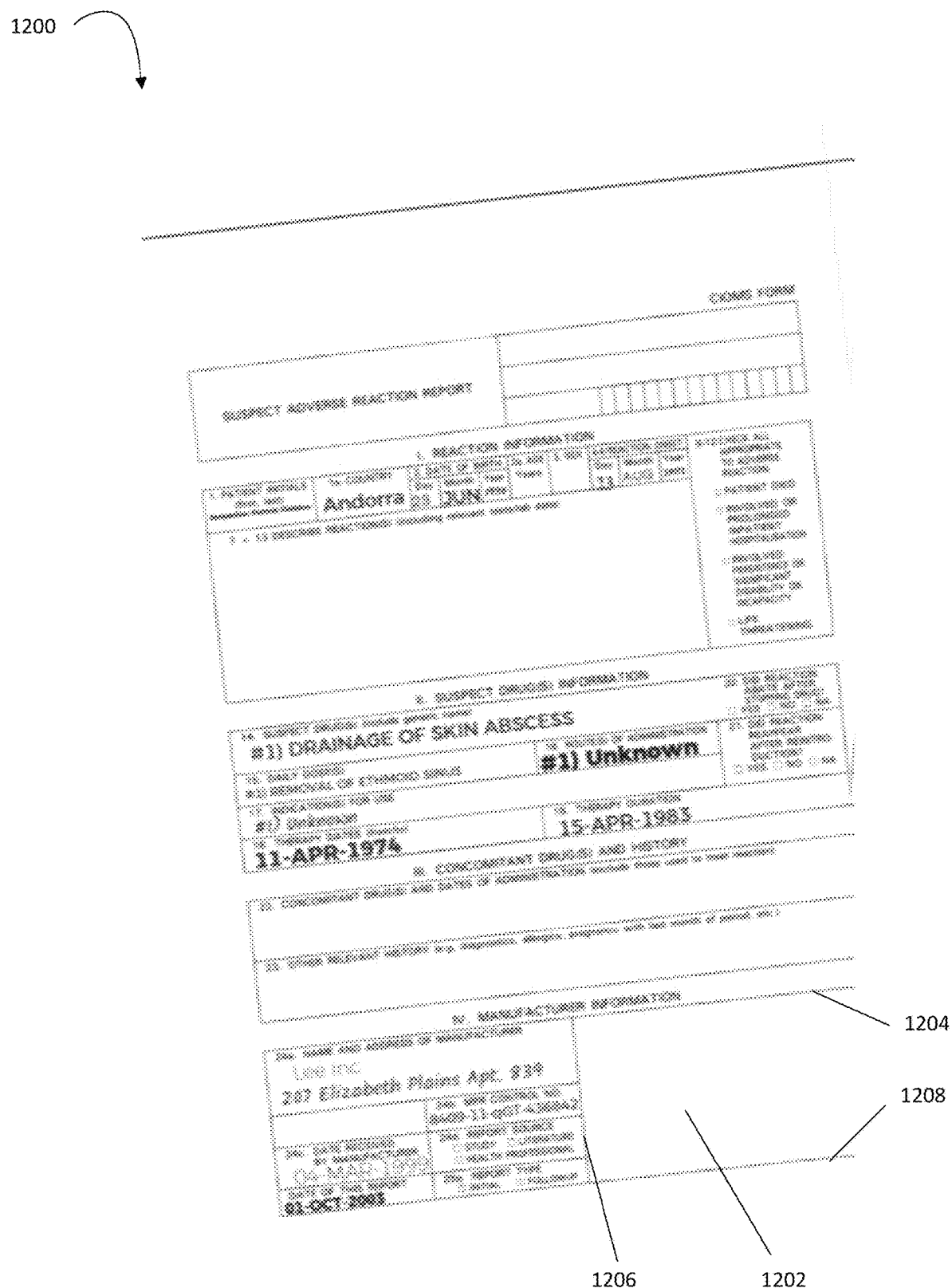
FIG. 12 is an image of a document generated by a synthetic document generation pipeline, according to one or more embodiments.

FIG. 12 is an image of a document 1200 generated by a synthetic document generation pipeline, according to one or more embodiments. FIG. 12 is an image of the same document class (suspect adverse reaction report) as provided in FIGS. 10 and 11. FIG. 12 differs from FIGS. 10 and 11 in that the subsections have been populated with different text and the document has been augmented to include a rotation and cropping to provide a partial view of the suspect adverse reaction report. Additionally, it can be seen in FIGS. 10 and 11, that the bottom right hand section includes a name and address of reporter section, which includes the text "Harris, Zavala and Ray," "New Colleen, FL 18311," and "New Colleen, FL 18311." It can further be seen that in FIG. 12, the bottom right hand corner includes a blank section 1202. Through an adversarial injection (e.g., through adversarial injection 412), the document has been altered to change the name and address of reporter section to be blank. It should be appreciated that even though the adversarial injection altered the bottom right hand section, the document 1200 appears to be a normal document, even after the alteration. For example, the lines 1204, 1206, 1208 that form the boundaries of the name and address of reporter section of FIGS. 10 and 11, and the blank section 1202 of FIG. 12 are still present. Therefore, to the human eye, the document still appears to be real-world document.

Figure 13:
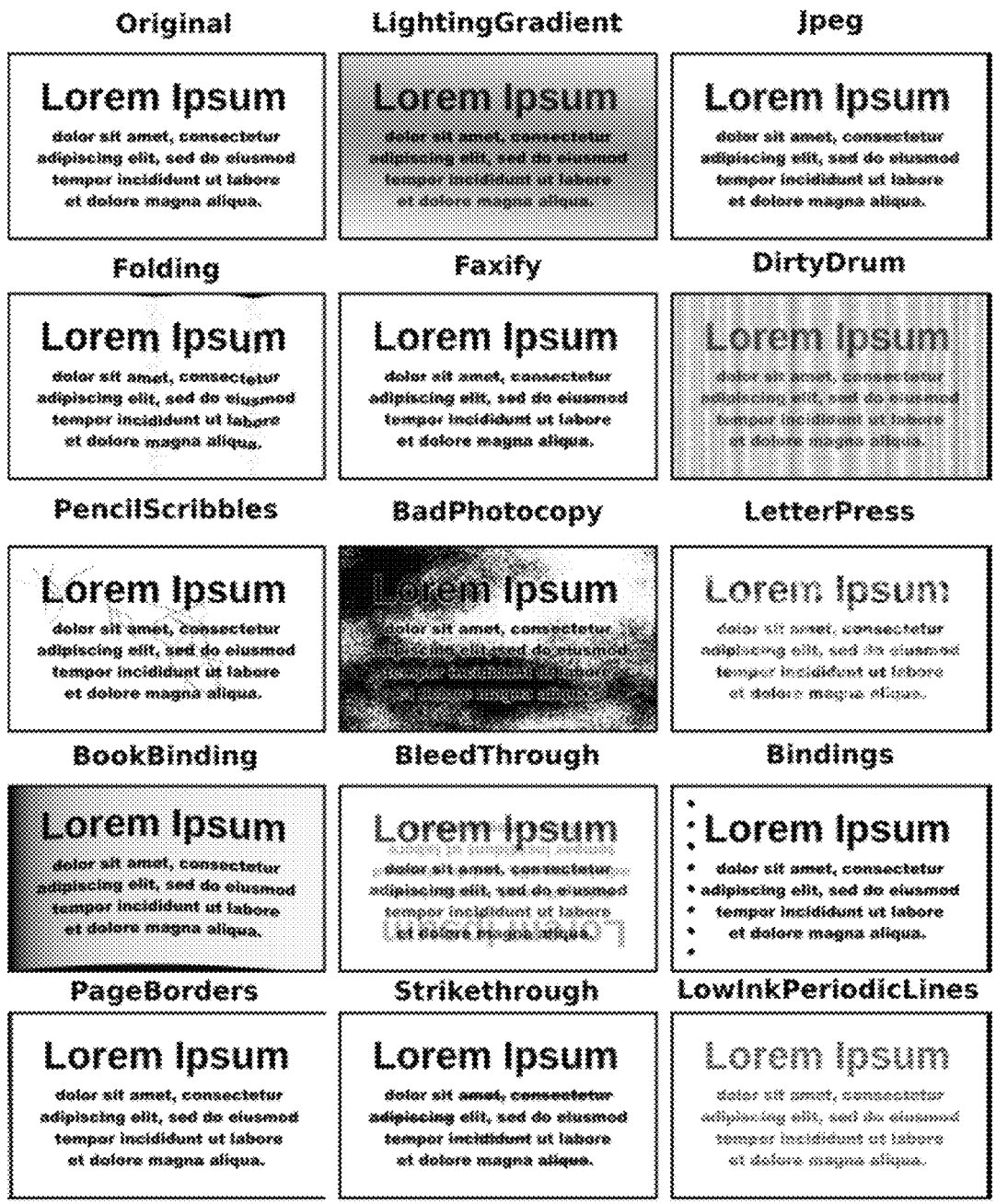
FIG. 13 is an image of various degradation techniques that can be implemented by a synthetic document generation pipeline, according to one or more embodiments.
Figure 14:
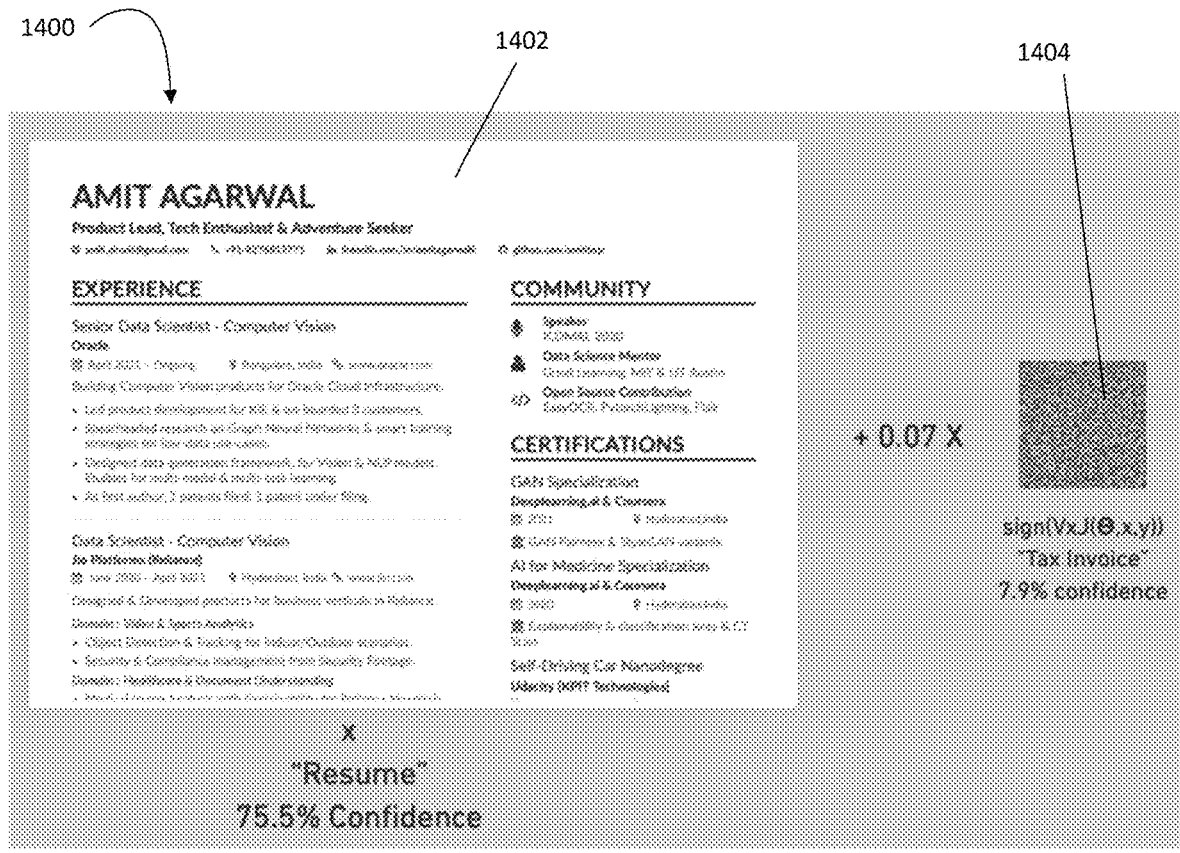
FIG. 14 is an illustration of adding noise that is imperceptible to a human to an image to affect a machine learning model prediction, according to one or more embodiments.
Figure 14:
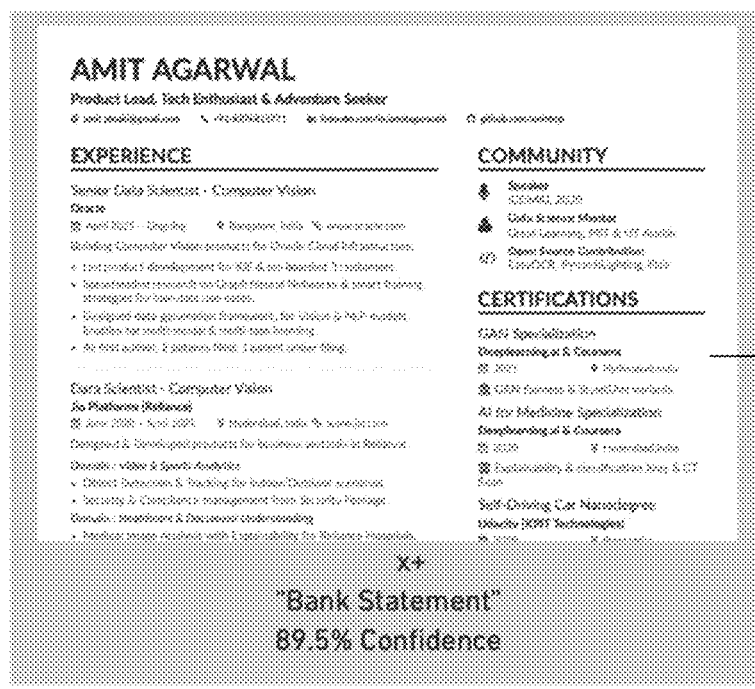

FIG. 13 is an image 1300 of various degradation techniques that can be implemented by a synthetic document generation pipeline, according to one or more embodiments. FIG. 13 includes fifteen images that have been augmented using respective degradation techniques. for example, an augmentation unit (e.g., augmentation unit 402). Each of the fifteen images includes the same alphanumeric characters. Various degradation techniques have been implemented on each image. It should be appreciated that FIG. 13 is illustrative of some degradation techniques that can be applied by an augmentation unit. In a practical application, the augmentation unit can great apply any number of degradation techniques based on control instructions FIG. 14 is an illustration of adding noise that is imperceptible to a human to an image to affect a machine learning model prediction, according to one or more embodiments. As seen, a processor using a machine learning model has classified a first image 1402 as that of a resume with a 75.5% confidence. Using a human eye, it can be seen that the machine learning model has properly classified the first image 1402 as that of a resume. FIG. 14 further shows an example of noise 1404 that can be added to the image 1402 to cause a processer using a machine learning model to misclassify the first image 1402. The noise has been classified as a tax invoice with a 7.9% confidence. It can further be seen that a processor using a machine learning model has misclassified a second image 1406 as that of a bank statement with an 89.5% confidence. The second image 1406 is an example of an adversarial sample that is designed to cause a machine learning model to misclassify the input. As seen to the human eye, the first image 1402 and the second image 1406, appear to be the same. However, the noise 1404 introduced to the image 1402 causes the processor using the machine learning model to misclassify the resume as a bank statement with a relatively high level of confidence. The herein described framework allows machine learning models to be trained to be robust to adversarial samples. It can be seen that the adversarial injection 1412 can assist the framework to create adversarial samples that can be used to train a machine learning model to be more robust and resistant to adversarial sample attacks.

Figure 15:
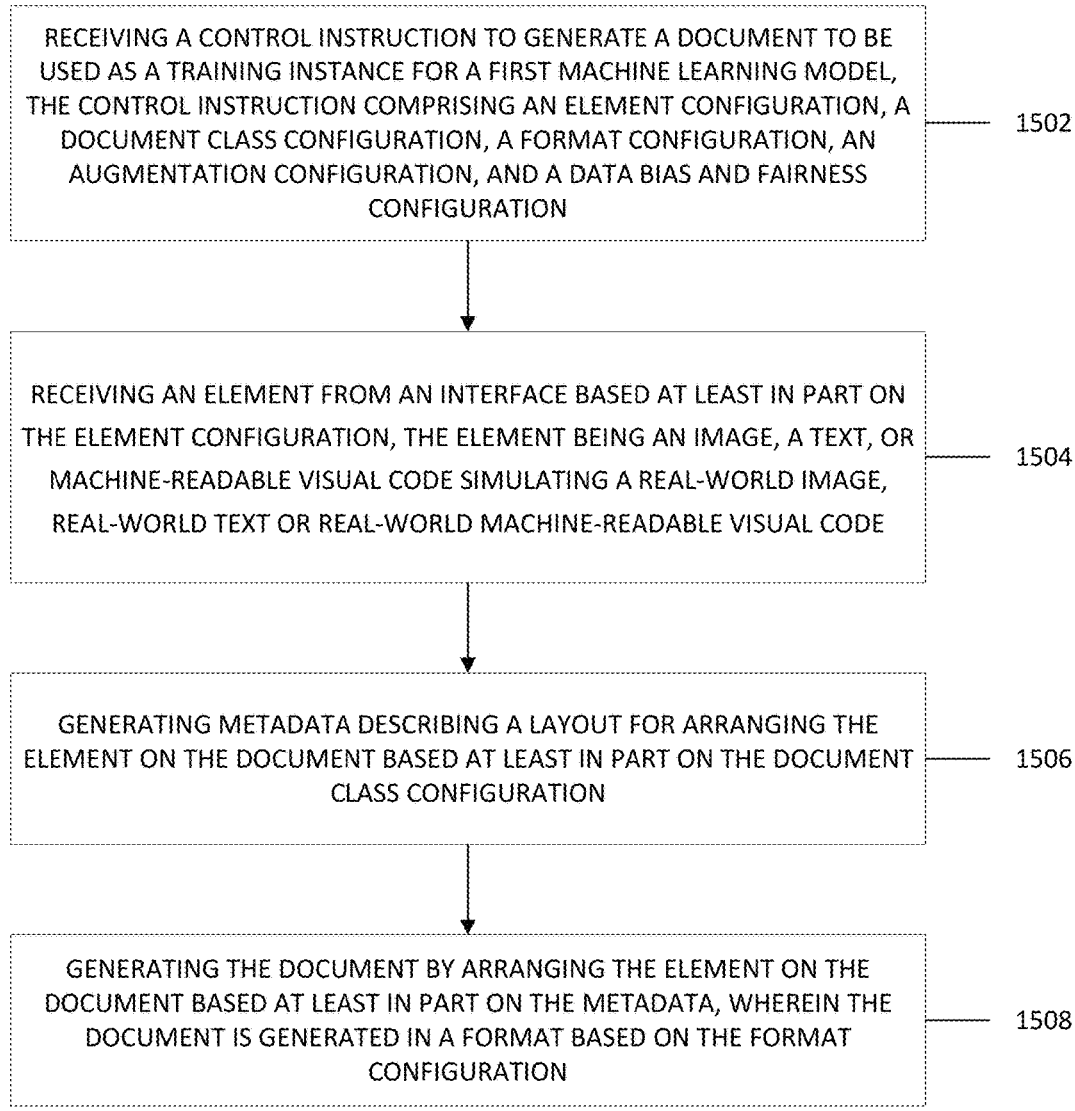
FIG. 15 is a process flow for a synthetic document generation pipeline, according to one or more embodiments.

FIG. 15 is a process flow 1500 for a synthetic document generation pipeline, according to one or more embodiments. While the operations of process 1500 are described as being performed by generic computers, it should be understood that any suitable device (e.g., a user device, a server device) may be used to perform one or more operations of this process. Process 1500 (described below) is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

At 1502, the process 1500 can include receiving, by a computing device, a control instruction to generate a document to be used as a training instance for a first machine learning model, the control instruction comprising an element configuration, a document class configuration, a format configuration, an augmentation configuration, and a data bias and fairness configuration. The computing device can be a data synthesizer (e.g., data synthesizer 202) of a data generator (e.g., data generator 104). The control instruction can be generated based on a user selection and be received from a configuration layer (e.g., configuration layer 106). The element configuration can include an instruction to include the element in the document. The document class configuration can include a type of document and an indication of whether the document is a template-based document or a template-less document.

At 1504, the process 1500 can include receiving, by the computing device, an element from an interface based at least in part on the element configuration, the element being an image, a text, or machine-readable visual code simulating a real-world image, real-world text or real-world machine-readable visual code. The element can be received by an interface of an input interface (e.g., input interface 102). For example, the input interface can also receive a control instruction indicating the type of element to transmit to the computing device. The input interface can transmit the element based on the control instruction.

At 1506, the process 1500 can include generating, by the computing device, metadata describing a layout for arranging the element on the document based at least in part on the document class configuration. The metadata can be generated by a layout generator (e.g., layout generator 212) In some instances, the document is a template-based document and in other instances, the document is a template-less document. The computing device can determine whether the document is template-based or template-less based on the document class configuration. If the document is a template-based document, the computing device can use a template as indicated by the document class configuration. The template can resemble a template for a real-world document. Furthermore, the metadata can describe the element arrangement similarly to the way the element would have been arranged on the real-world document. If, however, the document is a template-less document, the computing device can select a non-overlapping layout, a historical-based layout, or a machine learning-based layout.

At 1508, the process 1500 can include generating, by the computing device, the document by arranging the element on the document based at least in part on the metadata, wherein the document is generated in a format based on the format configuration. The computing device can read the metadata and arrange the element on the document accordingly. Arranging the element on the document can be performed, for example, by a document and label renderer (e.g., document and label renderer 214). The document can further be generated in a format appropriate for a target machine learning task. For example, the format can be image only, text only, image and text, HTML/XML, or other appropriate format.

In some instances, the process 1500 can further include augmenting, by the computing device, the element on the document based at least in part on the augmentation configuration. The augmentation can include an augmentation unit (e.g., augmentation unit 402) creating a replica of the document and process the replica through a degradation process. The textual or image degradation process can cause the replica to appear to have deteriorated due to real-world degradation. The degradation can be to an image included in the document, a text included in the document, or a combination of an image and a text. In other instances, the augmentation configuration indicates that no augmentation is to be performed.

The process 1500 can result in multiple documents being generated based on the needs of the machine learning model. For example, the documents illustrated in FIGS. 10, 11, and 12. The documents can further be generated in multiple formats, such as image, portable document format (pdf), hypertext markup language (html), document (e.g., .doc) formats. Training instances for a target machine learning task can be created from the documents. The training instances can be input into a machine learning model to train the model to perform some target task.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 16:
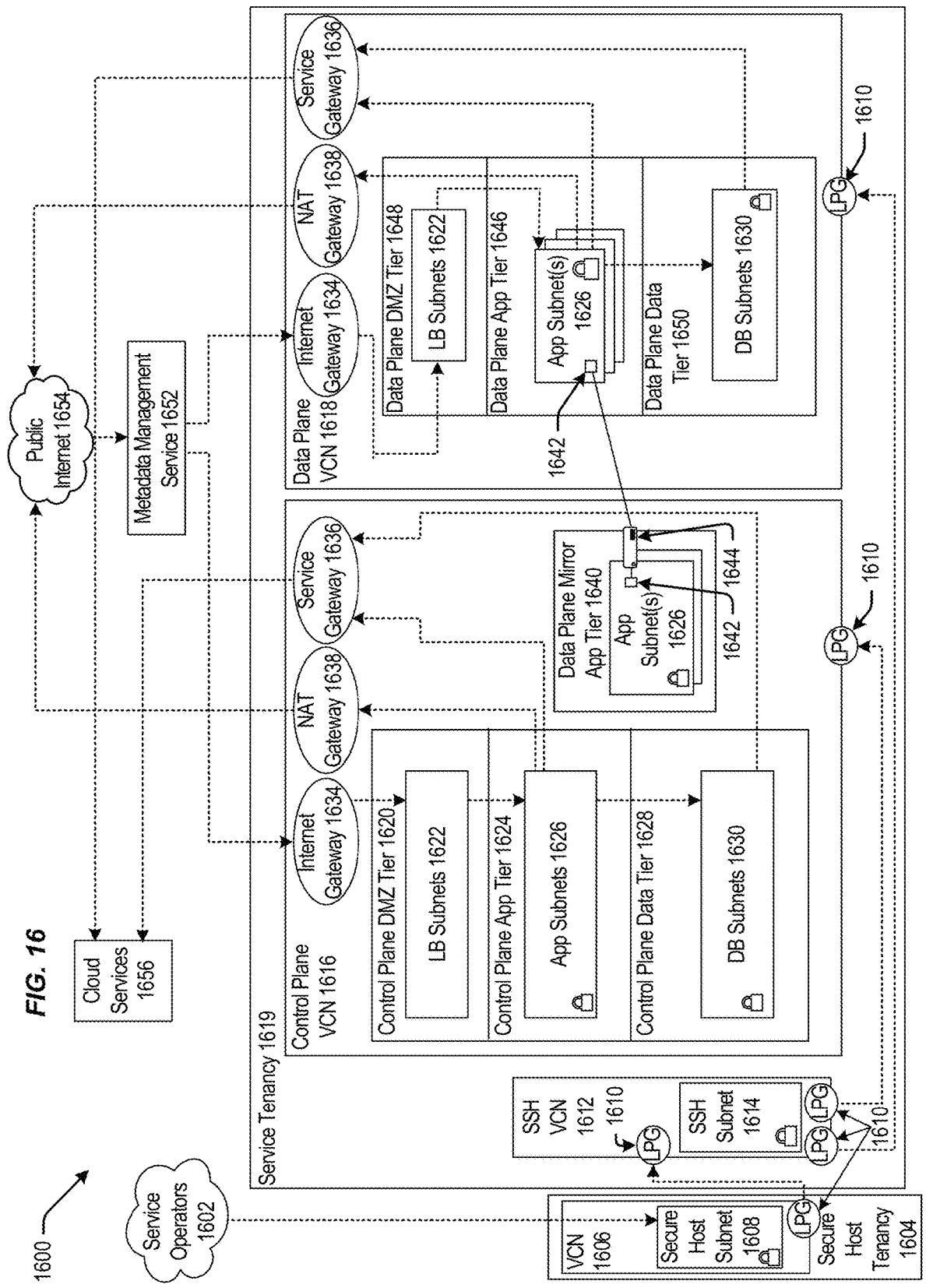
FIG. 16 is a block diagram illustrating one pattern for implementing a cloud infrastructure as a service system, according to at least one embodiment.

FIG. 16 is a block diagram 1600 illustrating an example pattern of an IaaS architecture, according to at least one embodiment. Service operators 1602 can be communicatively coupled to a secure host tenancy 1604 that can include a virtual cloud network (VCN) 1606 and a secure host subnet 1608. In some examples, the service operators 1602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1606 and/or the Internet.

The VCN 1606 can include a local peering gateway (LPG) 1610 that can be communicatively coupled to a secure shell (SSH) VCN 1612 via an LPG 1610 contained in the SSH VCN 1612. The SSH VCN 1612 can include an SSH subnet 1614, and the SSH VCN 1612 can be communicatively coupled to a control plane VCN 1616 via the LPG 1610 contained in the control plane VCN 1616. Also, the SSH VCN 1612 can be communicatively coupled to a data plane VCN 1618 via an LPG 1610. The control plane VCN 1616 and the data plane VCN 1618 can be contained in a service tenancy 1619 that can be owned and/or operated by the IaaS provider.

The control plane VCN 1616 can include a control plane demilitarized zone (DMZ) tier 1620 that acts as a perimeter network (e.g., portions of a corporate network between the corporate intranet and external networks). The DMZ-based servers may have restricted responsibilities and help keep breaches contained. Additionally, the DMZ tier 1620 can include one or more load balancer (LB) subnet(s) 1622, a control plane app tier 1624 that can include app subnet(s) 1626, a control plane data tier 1628 that can include database (DB) subnet(s) 1630 (e.g., frontend DB subnet(s) and/or backend DB subnet(s)). The LB subnet(s) 1622 contained in the control plane DMZ tier 1620 can be communicatively coupled to the app subnet(s) 1626 contained in the control plane app tier 1624 and an Internet gateway 1634 that can be contained in the control plane VCN 1616, and the app subnet(s) 1626 can be communicatively coupled to the DB subnet(s) 1630 contained in the control plane data tier 1628 and a service gateway 1636 and a network address translation (NAT) gateway 1638. The control plane VCN 1616 can include the service gateway 1636 and the NAT gateway 1638.

The control plane VCN 1616 can include a data plane mirror app tier 1640 that can include app subnet(s) 1626. The app subnet(s) 1626 contained in the data plane mirror app tier 1640 can include a virtual network interface controller (VNIC) 1642 that can execute a compute instance 1644. The compute instance 1644 can communicatively couple the app subnet(s) 1626 of the data plane mirror app tier 1640 to app subnet(s) 1626 that can be contained in a data plane app tier 1646.

The data plane VCN 1618 can include the data plane app tier 1646, a data plane DMZ tier 1648, and a data plane data tier 1650. The data plane DMZ tier 1648 can include LB subnet(s) 1622 that can be communicatively coupled to the app subnet(s) 1626 of the data plane app tier 1646 and the Internet gateway 1634 of the data plane VCN 1618. The app subnet(s) 1626 can be communicatively coupled to the service gateway 1636 of the data plane VCN 1618 and the NAT gateway 1638 of the data plane VCN 1618. The data plane data tier 1650 can also include the DB subnet(s) 1630 that can be communicatively coupled to the app subnet(s) 1626 of the data plane app tier 1646.

The Internet gateway 1634 of the control plane VCN 1616 and of the data plane VCN 1618 can be communicatively coupled to a metadata management service 1652 that can be communicatively coupled to public Internet 1654. Public Internet 1654 can be communicatively coupled to the NAT gateway 1638 of the control plane VCN 1616 and of the data plane VCN 1618. The service gateway 1636 of the control plane VCN 1616 and of the data plane VCN 1618 can be communicatively couple to cloud services 1656.

In some examples, the service gateway 1636 of the control plane VCN 1616 or of the data plane VCN 1618 can make application programming interface (API) calls to cloud services 1656 without going through public Internet 1654. The API calls to cloud services 1656 from the service gateway 1636 can be one-way: the service gateway 1636 can make API calls to cloud services 1656, and cloud services 1656 can send requested data to the service gateway 1636. But, cloud services 1656 may not initiate API calls to the service gateway 1636.

In some examples, the secure host tenancy 1604 can be directly connected to the service tenancy 1619, which may be otherwise isolated. The secure host subnet 1608 can communicate with the SSH subnet 1614 through an LPG 1610 that may enable two-way communication over an otherwise isolated system. Connecting the secure host subnet 1608 to the SSH subnet 1614 may give the secure host subnet 1608 access to other entities within the service tenancy 1619.

The control plane VCN 1616 may allow users of the service tenancy 1619 to set up or otherwise provision desired resources. Desired resources provisioned in the control plane VCN 1616 may be deployed or otherwise used in the data plane VCN 1618. In some examples, the control plane VCN 1616 can be isolated from the data plane VCN 1618, and the data plane mirror app tier 1640 of the control plane VCN 1616 can communicate with the data plane app tier 1646 of the data plane VCN 1618 via VNICs 1642 that can be contained in the data plane mirror app tier 1640 and the data plane app tier 1646.

In some examples, users of the system, or customers, can make requests, for example create, read, update, or delete (CRUD) operations, through public Internet 1654 that can communicate the requests to the metadata management service 1652. The metadata management service 1652 can communicate the request to the control plane VCN 1616 through the Internet gateway 1634. The request can be received by the LB subnet(s) 1622 contained in the control plane DMZ tier 1620. The LB subnet(s) 1622 may determine that the request is valid, and in response to this determination, the LB subnet(s) 1622 can transmit the request to app subnet(s) 1626 contained in the control plane app tier 1624. If the request is validated and requires a call to public Internet 1654, the call to public Internet 1654 may be transmitted to the NAT gateway 1638 that can make the call to public Internet 1654. Metadata that may be desired to be stored by the request can be stored in the DB subnet(s) 1630.

In some examples, the data plane mirror app tier 1640 can facilitate direct communication between the control plane VCN 1616 and the data plane VCN 1618. For example, changes, updates, or other suitable modifications to configuration may be desired to be applied to the resources contained in the data plane VCN 1618. Via a VNIC 1642, the control plane VCN 1616 can directly communicate with, and can thereby execute the changes, updates, or other suitable modifications to configuration to, resources contained in the data plane VCN 1618.

In some embodiments, the control plane VCN 1616 and the data plane VCN 1618 can be contained in the service tenancy 1619. In this case, the user, or the customer, of the system may not own or operate either the control plane VCN 1616 or the data plane VCN 1618. Instead, the IaaS provider may own or operate the control plane VCN 1616 and the data plane VCN 1618, both of which may be contained in the service tenancy 1619. This embodiment can enable isolation of networks that may prevent users or customers from interacting with other users', or other customers', resources. Also, this embodiment may allow users or customers of the system to store databases privately without needing to rely on public Internet 1654, which may not have a desired level of threat prevention, for storage.

In other embodiments, the LB subnet(s) 1622 contained in the control plane VCN 1616 can be configured to receive a signal from the service gateway 1636. In this embodiment, the control plane VCN 1616 and the data plane VCN 1618 may be configured to be called by a customer of the IaaS provider without calling public Internet 1654. Customers of the IaaS provider may desire this embodiment since database(s) that the customers use may be controlled by the IaaS provider and may be stored on the service tenancy 1619, which may be isolated from public Internet 1654.

Figure 17:
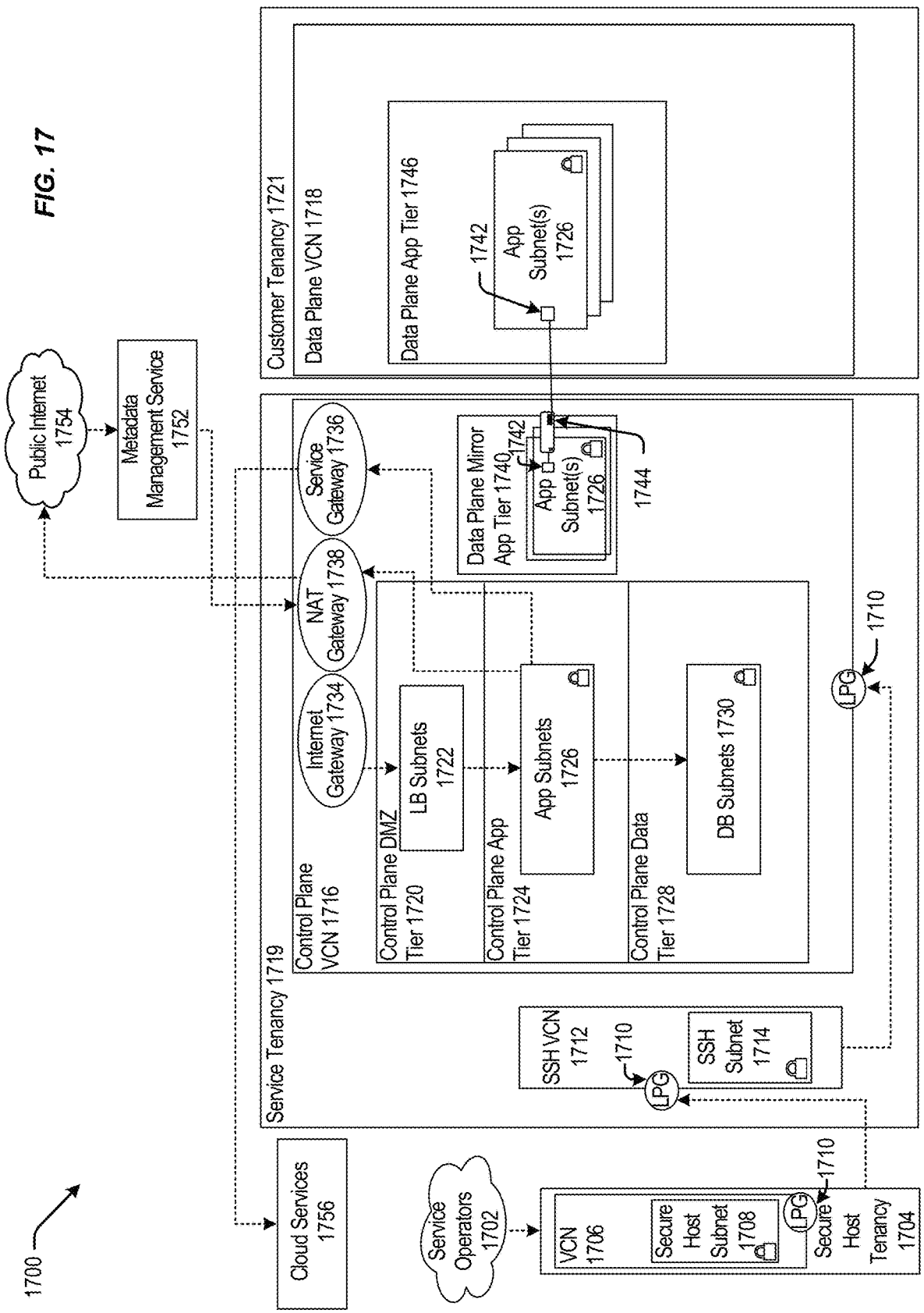
FIG. 17 is a block diagram illustrating another pattern for implementing a cloud infrastructure as a service system, according to at least one embodiment.

FIG. 17 is a block diagram 1700 illustrating another example pattern of an IaaS architecture, according to at least one embodiment. Service operators 1702 (e.g., service operators 1602 of FIG. 16) can be communicatively coupled to a secure host tenancy 1704 (e.g., the secure host tenancy 1604 of FIG. 16) that can include a virtual cloud network (VCN) 1706 (e.g., the VCN 1606 of FIG. 16) and a secure host subnet 1708 (e.g., the secure host subnet 1608 of FIG. 16). The VCN 1706 can include a local peering gateway (LPG) 1710 (e.g., the LPG 1610 of FIG. 16) that can be communicatively coupled to a secure shell (SSH) VCN 1712 (e.g., the SSH VCN 1612 of FIG. 16) via an LPG 1610 contained in the SSH VCN 1712. The SSH VCN 1712 can include an SSH subnet 1714 (e.g., the SSH subnet 1614 of FIG. 16), and the SSH VCN 1712 can be communicatively coupled to a control plane VCN 1716 (e.g., the control plane VCN 1616 of FIG. 16) via an LPG 1710 contained in the control plane VCN 1716. The control plane VCN 1716 can be contained in a service tenancy 1719 (e.g., the service tenancy 1619 of FIG. 16), and the data plane VCN 1718 (e.g., the data plane VCN 1618 of FIG. 16) can be contained in a customer tenancy 1721 that may be owned or operated by users, or customers, of the system.

The control plane VCN 1716 can include a control plane DMZ tier 1720 (e.g., the control plane DMZ tier 1620 of FIG. 16) that can include LB subnet(s) 1722 (e.g., LB subnet(s) 1622 of FIG. 16), a control plane app tier 1724 (e.g., the control plane app tier 1624 of FIG. 16) that can include app subnet(s) 1726 (e.g., app subnet(s) 1626 of FIG. 16), a control plane data tier 1728 (e.g., the control plane data tier 1628 of FIG. 16) that can include database (DB) subnet(s) 1730 (e.g., similar to DB subnet(s) 1630 of FIG. 16). The LB subnet(s) 1722 contained in the control plane DMZ tier 1720 can be communicatively coupled to the app subnet(s) 1726 contained in the control plane app tier 1724 and an Internet gateway 1734 (e.g., the Internet gateway 1634 of FIG. 16) that can be contained in the control plane VCN 1716, and the app subnet(s) 1726 can be communicatively coupled to the DB subnet(s) 1730 contained in the control plane data tier 1728 and a service gateway 1736 (e.g., the service gateway 1636 of FIG. 16) and a network address translation (NAT) gateway 1738 (e.g., the NAT gateway 1638 of FIG. 16). The control plane VCN 1716 can include the service gateway 1736 and the NAT gateway 1738.

The control plane VCN 1716 can include a data plane mirror app tier 1740 (e.g., the data plane mirror app tier 1640 of FIG. 16) that can include app subnet(s) 1726. The app subnet(s) 1726 contained in the data plane mirror app tier 1740 can include a virtual network interface controller (VNIC) 1742 (e.g., the VNIC of 1642) that can execute a compute instance 1744 (e.g., similar to the compute instance 1644 of FIG. 16). The compute instance 1744 can facilitate communication between the app subnet(s) 1726 of the data plane mirror app tier 1740 and the app subnet(s) 1726 that can be contained in a data plane app tier 1746 (e.g., the data plane app tier 1646 of FIG. 16) via the VNIC 1742 contained in the data plane mirror app tier 1740 and the VNIC 1742 contained in the data plane app tier 1746.

The Internet gateway 1734 contained in the control plane VCN 1716 can be communicatively coupled to a metadata management service 1752 (e.g., the metadata management service 1652 of FIG. 16) that can be communicatively coupled to public Internet 1754 (e.g., public Internet 1654 of FIG. 16). Public Internet 1754 can be communicatively coupled to the NAT gateway 1738 contained in the control plane VCN 1716. The service gateway 1736 contained in the control plane VCN 1716 can be communicatively couple to cloud services 1756 (e.g., cloud services 1656 of FIG. 16).

In some examples, the data plane VCN 1718 can be contained in the customer tenancy 1721. In this case, the IaaS provider may provide the control plane VCN 1716 for each customer, and the IaaS provider may, for each customer, set up a unique compute instance 1744 that is contained in the service tenancy 1719. Each compute instance 1744 may allow communication between the control plane VCN 1716, contained in the service tenancy 1719, and the data plane VCN 1718 that is contained in the customer tenancy 1721. The compute instance 1744 may allow resources, that are provisioned in the control plane VCN 1716 that is contained in the service tenancy 1719, to be deployed or otherwise used in the data plane VCN 1718 that is contained in the customer tenancy 1721.

In other examples, the customer of the IaaS provider may have databases that live in the customer tenancy 1721. In this example, the control plane VCN 1716 can include the data plane mirror app tier 1740 that can include app subnet(s) 1726. The data plane mirror app tier 1740 can reside in the data plane VCN 1718, but the data plane mirror app tier 1740 may not live in the data plane VCN 1718. That is, the data plane mirror app tier 1740 may have access to the customer tenancy 1721, but the data plane mirror app tier 1740 may not exist in the data plane VCN 1718 or be owned or operated by the customer of the IaaS provider. The data plane mirror app tier 1740 may be configured to make calls to the data plane VCN 1718 but may not be configured to make calls to any entity contained in the control plane VCN 1716. The customer may desire to deploy or otherwise use resources in the data plane VCN 1718 that are provisioned in the control plane VCN 1716, and the data plane mirror app tier 1740 can facilitate the desired deployment, or other usage of resources, of the customer.

In some embodiments, the customer of the IaaS provider can apply filters to the data plane VCN 1718. In this embodiment, the customer can determine what the data plane VCN 1718 can access, and the customer may restrict access to public Internet 1754 from the data plane VCN 1718. The IaaS provider may not be able to apply filters or otherwise control access of the data plane VCN 1718 to any outside networks or databases. Applying filters and controls by the customer onto the data plane VCN 1718, contained in the customer tenancy 1721, can help isolate the data plane VCN 1718 from other customers and from public Internet 1754.

In some embodiments, cloud services 1756 can be called by the service gateway 1736 to access services that may not exist on public Internet 1754, on the control plane VCN 1716, or on the data plane VCN 1718. The connection between cloud services 1756 and the control plane VCN 1716 or the data plane VCN 1718 may not be live or continuous. Cloud services 1756 may exist on a different network owned or operated by the IaaS provider. Cloud services 1756 may be configured to receive calls from the service gateway 1736 and may be configured to not receive calls from public Internet 1754. Some cloud services 1756 may be isolated from other cloud services 1756, and the control plane VCN 1716 may be isolated from cloud services 1756 that may not be in the same region as the control plane VCN 1716. For example, the control plane VCN 1716 may be located in "Region 1," and cloud service "Deployment 16," may be located in Region 1 and in "Region 2." If a call to Deployment 16 is made by the service gateway 1736 contained in the control plane VCN 1716 located in Region 1, the call may be transmitted to Deployment 16 in Region 1. In this example, the control plane VCN 1716, or Deployment 16 in Region 1, may not be communicatively coupled to, or otherwise in communication with, Deployment 16 in Region 2.

Figure 18:
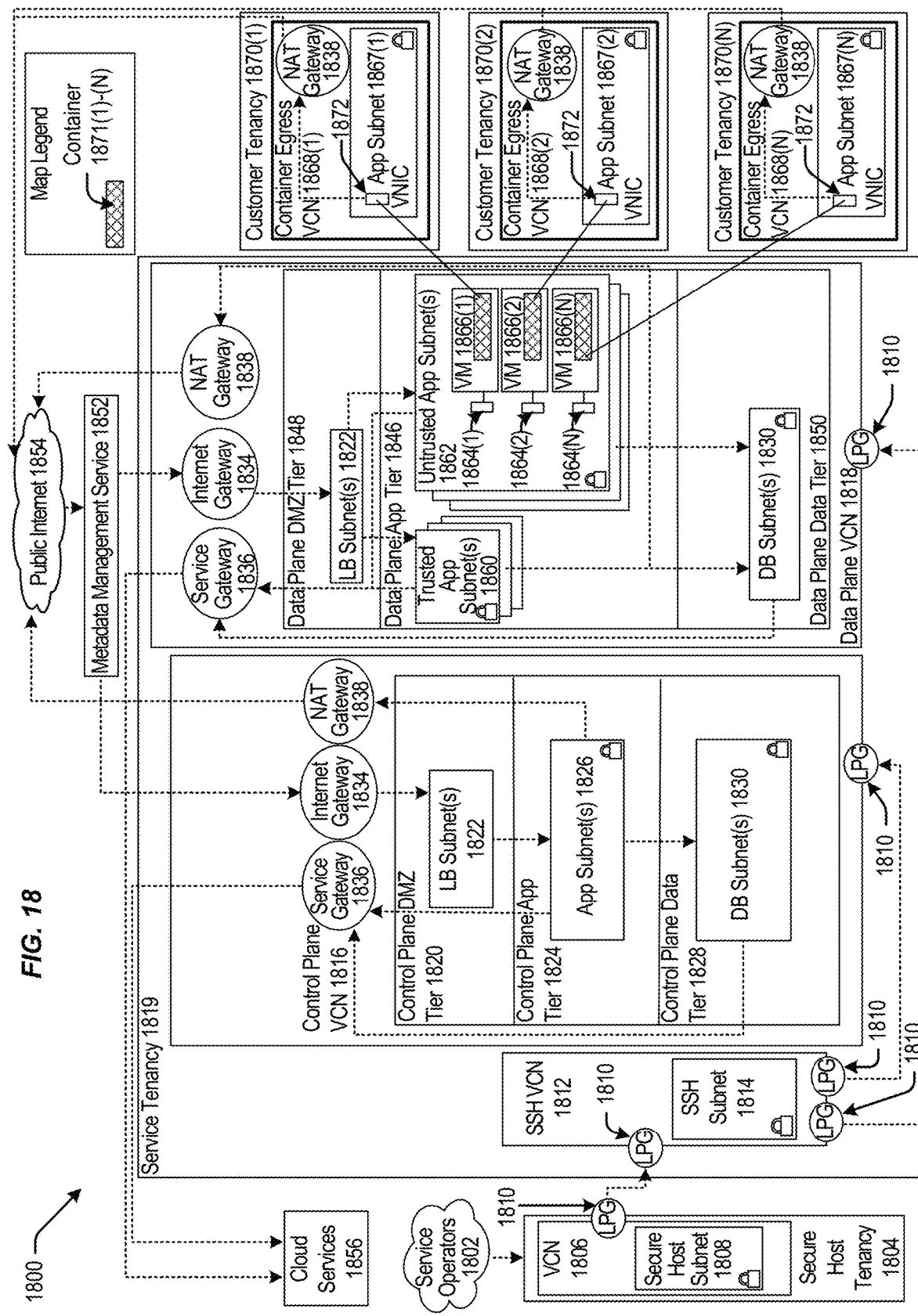
FIG. 18 is a block diagram illustrating another pattern for implementing a cloud infrastructure as a service system, according to at least one embodiment.

FIG. 18 is a block diagram 1800 illustrating another example pattern of an IaaS architecture, according to at least one embodiment. Service operators 1802 (e.g., service operators 1602 of FIG. 16) can be communicatively coupled to a secure host tenancy 1804 (e.g., the secure host tenancy 1604 of FIG. 16) that can include a virtual cloud network (VCN) 1806 (e.g., the VCN 1606 of FIG. 16) and a secure host subnet 1808 (e.g., the secure host subnet 1608 of FIG. 16). The VCN 1806 can include an LPG 1810 (e.g., the LPG 1610 of FIG. 16) that can be communicatively coupled to an SSH VCN 1812 (e.g., the SSH VCN 1612 of FIG. 16) via an LPG 1810 contained in the SSH VCN 1812. The SSH VCN 1812 can include an SSH subnet 1814 (e.g., the SSH subnet 1614 of FIG. 16), and the SSH VCN 1812 can be communicatively coupled to a control plane VCN 1816 (e.g., the control plane VCN 1616 of FIG. 16) via an LPG 1810 contained in the control plane VCN 1816 and to a data plane VCN 1818 (e.g., the data plane 1618 of FIG. 16) via an LPG 1810 contained in the data plane VCN 1818. The control plane VCN 1816 and the data plane VCN 1818 can be contained in a service tenancy 1819 (e.g., the service tenancy 1619 of FIG. 16).

The control plane VCN 1816 can include a control plane DMZ tier 1820 (e.g., the control plane DMZ tier 1620 of FIG. 16) that can include load balancer (LB) subnet(s) 1822 (e.g., LB subnet(s) 1622 of FIG. 16), a control plane app tier 1824 (e.g., the control plane app tier 1624 of FIG. 16) that can include app subnet(s) 1826 (e.g., similar to app subnet(s) 1626 of FIG. 16), a control plane data tier 1828 (e.g., the control plane data tier 1628 of FIG. 16) that can include DB subnet(s) 1830. The LB subnet(s) 1822 contained in the control plane DMZ tier 1820 can be communicatively coupled to the app subnet(s) 1826 contained in the control plane app tier 1824 and to an Internet gateway 1834 (e.g., the Internet gateway 1634 of FIG. 16) that can be contained in the control plane VCN 1816, and the app subnet(s) 1826 can be communicatively coupled to the DB subnet(s) 1830 contained in the control plane data tier 1828 and to a service gateway 1836 (e.g., the service gateway of FIG. 16) and a network address translation (NAT) gateway 1838 (e.g., the NAT gateway 1638 of FIG. 16). The control plane VCN 1816 can include the service gateway 1836 and the NAT gateway 1838.

The data plane VCN 1818 can include a data plane app tier 1846 (e.g., the data plane app tier 1646 of FIG. 16), a data plane DMZ tier 1848 (e.g., the data plane DMZ tier 1648 of FIG. 16), and a data plane data tier 1850 (e.g., the data plane data tier 1650 of FIG. 16). The data plane DMZ tier 1848 can include LB subnet(s) 1822 that can be communicatively coupled to trusted app subnet(s) 1860 and untrusted app subnet(s) 1862 of the data plane app tier 1846 and the Internet gateway 1834 contained in the data plane VCN 1818. The trusted app subnet(s) 1860 can be communicatively coupled to the service gateway 1836 contained in the data plane VCN 1818, the NAT gateway 1838 contained in the data plane VCN 1818, and DB subnet(s) 1830 contained in the data plane data tier 1850. The untrusted app subnet(s) 1862 can be communicatively coupled to the service gateway 1836 contained in the data plane VCN 1818 and DB subnet(s) 1830 contained in the data plane data tier 1850. The data plane data tier 1850 can include DB subnet(s) 1830 that can be communicatively coupled to the service gateway 1836 contained in the data plane VCN 1818.

The untrusted app subnet(s) 1862 can include one or more primary VNICs 1864(1)-(N) that can be communicatively coupled to tenant virtual machines (VMs) 1866(1)-(N). Each tenant VM 1866(1)-(N) can be communicatively coupled to a respective app subnet 1867(1)-(N) that can be contained in respective container egress VCNs 1868(1)-(N) that can be contained in respective customer tenancies 1870(1)-(N). Respective secondary VNICs 1872(1)-(N) can facilitate communication between the untrusted app subnet(s) 1862 contained in the data plane VCN 1818 and the app subnet contained in the container egress VCNs 1868(1)-(N). Each container egress VCNs 1868(1)-(N) can include a NAT gateway 1838 that can be communicatively coupled to public Internet 1854 (e.g., public Internet 1654 of FIG. 16).

The Internet gateway 1834 contained in the control plane VCN 1816 and contained in the data plane VCN 1818 can be communicatively coupled to a metadata management service 1852 (e.g., the metadata management system 1652 of FIG. 16) that can be communicatively coupled to public Internet 1854. Public Internet 1854 can be communicatively coupled to the NAT gateway 1838 contained in the control plane VCN 1816 and contained in the data plane VCN 1818. The service gateway 1836 contained in the control plane VCN 1816 and contained in the data plane VCN 1818 can be communicatively couple to cloud services 1856.

In some embodiments, the data plane VCN 1818 can be integrated with customer tenancies 1870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1846. Code to run the function may be executed in the VMs 1866(1)-(N), and the code may not be configured to run anywhere else on the data plane VCN 1818. Each VM 1866(1)-(N) may be connected to one customer tenancy 1870. Respective containers 1871(1)-(N) contained in the VMs 1866(1)-(N) may be configured to run the code. In this case, there can be a dual isolation (e.g., the containers 1871(1)-(N) running code, where the containers 1871(1)-(N) may be contained in at least the VM 1866(1)-(N) that are contained in the untrusted app subnet(s) 1862), which may help prevent incorrect or otherwise undesirable code from damaging the network of the IaaS provider or from damaging a network of a different customer. The containers 1871(1)-(N) may be communicatively coupled to the customer tenancy 1870 and may be configured to transmit or receive data from the customer tenancy 1870. The containers 1871(1)-(N) may not be configured to transmit or receive data from any other entity in the data plane VCN 1818. Upon completion of running the code, the IaaS provider may kill or otherwise dispose of the containers 1871(1)-(N).

In some embodiments, the trusted app subnet(s) 1860 may run code that may be owned or operated by the IaaS provider. In this embodiment, the trusted app subnet(s) 1860 may be communicatively coupled to the DB subnet(s) 1830 and be configured to execute CRUD operations in the DB subnet(s) 1830. The untrusted app subnet(s) 1862 may be communicatively coupled to the DB subnet(s) 1830, but in this embodiment, the untrusted app subnet(s) may be configured to execute read operations in the DB subnet(s) 1830. The containers 1871(1)-(N) that can be contained in the VM 1866(1)-(N) of each customer and that may run code from the customer may not be communicatively coupled with the DB subnet(s) 1830.

In other embodiments, the control plane VCN 1816 and the data plane VCN 1818 may not be directly communicatively coupled. In this embodiment, there may be no direct communication between the control plane VCN 1816 and the data plane VCN 1818. However, communication can occur indirectly through at least one method. An LPG 1810 may be established by the IaaS provider that can facilitate communication between the control plane VCN 1816 and the data plane VCN 1818. In another example, the control plane VCN 1816 or the data plane VCN 1818 can make a call to cloud services 1856 via the service gateway 1836. For example, a call to cloud services 1856 from the control plane VCN 1816 can include a request for a service that can communicate with the data plane VCN 1818.

Figure 19:
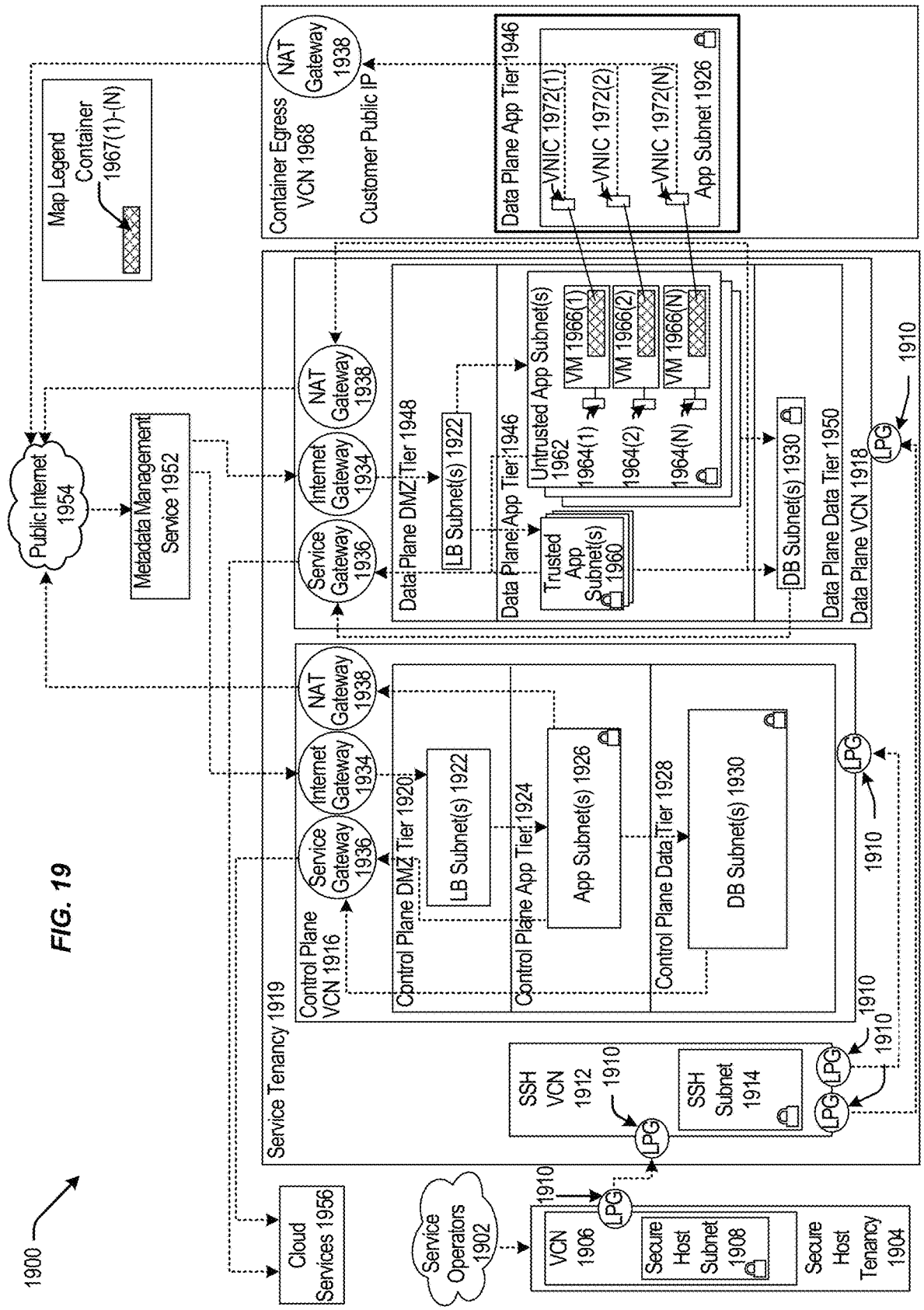
FIG. 19 is a block diagram illustrating another pattern for implementing a cloud infrastructure as a service system, according to at least one embodiment.

FIG. 19 is a block diagram 1900 illustrating another example pattern of an IaaS architecture, according to at least one embodiment. Service operators 1902 (e.g., service operators 1602 of FIG. 16) can be communicatively coupled to a secure host tenancy 1904 (e.g., the secure host tenancy 1604 of FIG. 16) that can include a virtual cloud network (VCN) 1906 (e.g., the VCN 1606 of FIG. 16) and a secure host subnet 1908 (e.g., the secure host subnet 1608 of FIG. 16). The VCN 1906 can include an LPG 1910 (e.g., the LPG 1610 of FIG. 16) that can be communicatively coupled to an SSH VCN 1912 (e.g., the SSH VCN 1612 of FIG. 16) via an LPG 1910 contained in the SSH VCN 1912. The SSH VCN 1912 can include an SSH subnet 1914 (e.g., the SSH subnet 1614 of FIG. 16), and the SSH VCN 1912 can be communicatively coupled to a control plane VCN 1916 (e.g., the control plane VCN 1616 of FIG. 16) via an LPG 1910 contained in the control plane VCN 1916 and to a data plane VCN 1918 (e.g., the data plane 1618 of FIG. 16) via an LPG 1910 contained in the data plane VCN 1918. The control plane VCN 1916 and the data plane VCN 1918 can be contained in a service tenancy 1919 (e.g., the service tenancy 1619 of FIG. 16).

The control plane VCN 1916 can include a control plane DMZ tier 1920 (e.g., the control plane DMZ tier 1620 of FIG. 16) that can include LB subnet(s) 1922 (e.g., LB subnet(s) 1622 of FIG. 16), a control plane app tier 1924 (e.g., the control plane app tier 1624 of FIG. 16) that can include app subnet(s) 1926 (e.g., app subnet(s) 1626 of FIG. 16), a control plane data tier 1928 (e.g., the control plane data tier 1628 of FIG. 16) that can include DB subnet(s) 1930 (e.g., DB subnet(s) 1830 of FIG. 18). The LB subnet(s) 1922 contained in the control plane DMZ tier 1920 can be communicatively coupled to the app subnet(s) 1926 contained in the control plane app tier 1924 and to an Internet gateway 1934 (e.g., the Internet gateway 1634 of FIG. 16) that can be contained in the control plane VCN 1916, and the app subnet(s) 1926 can be communicatively coupled to the DB subnet(s) 1930 contained in the control plane data tier 1928 and to a service gateway 1936 (e.g., the service gateway of FIG. 16) and a network address translation (NAT) gateway 1938 (e.g., the NAT gateway 1638 of FIG. 16). The control plane VCN 1916 can include the service gateway 1936 and the NAT gateway 1938.

The data plane VCN 1918 can include a data plane app tier 1946 (e.g., the data plane app tier 1646 of FIG. 16), a data plane DMZ tier 1948 (e.g., the data plane DMZ tier 1648 of FIG. 16), and a data plane data tier 1950 (e.g., the data plane data tier 1650 of FIG. 16). The data plane DMZ tier 1948 can include LB subnet(s) 1922 that can be communicatively coupled to trusted app subnet(s) 1960 (e.g., trusted app subnet(s) 1860 of FIG. 18) and untrusted app subnet(s) 1962 (e.g., untrusted app subnet(s) 1862 of FIG. 18) of the data plane app tier 1946 and the Internet gateway 1934 contained in the data plane VCN 1918. The trusted app subnet(s) 1960 can be communicatively coupled to the service gateway 1936 contained in the data plane VCN 1918, the NAT gateway 1938 contained in the data plane VCN 1918, and DB subnet(s) 1930 contained in the data plane data tier 1950. The untrusted app subnet(s) 1962 can be communicatively coupled to the service gateway 1936 contained in the data plane VCN 1918 and DB subnet(s) 1930 contained in the data plane data tier 1950. The data plane data tier 1950 can include DB subnet(s) 1930 that can be communicatively coupled to the service gateway 1936 contained in the data plane VCN 1918.

The untrusted app subnet(s) 1962 can include primary VNICs 1964(1)-(N) that can be communicatively coupled to tenant virtual machines (VMs) 1966(1)-(N) residing within the untrusted app subnet(s) 1962. Each tenant VM 1966(1)-(N) can run code in a respective container 1967(1)-(N), and be communicatively coupled to an app subnet 1926 that can be contained in a data plane app tier 1946 that can be contained in a container egress VCN 1968. Respective secondary VNICs 1972(1)-(N) can facilitate communication between the untrusted app subnet(s) 1962 contained in the data plane VCN 1918 and the app subnet contained in the container egress VCN 1968. The container egress VCN can include a NAT gateway 1938 that can be communicatively coupled to public Internet 1954 (e.g., public Internet 1654 of FIG. 16).

The Internet gateway 1934 contained in the control plane VCN 1916 and contained in the data plane VCN 1918 can be communicatively coupled to a metadata management service 1952 (e.g., the metadata management system 1652 of FIG. 16) that can be communicatively coupled to public Internet 1954. Public Internet 1954 can be communicatively coupled to the NAT gateway 1938 contained in the control plane VCN 1916 and contained in the data plane VCN 1918. The service gateway 1936 contained in the control plane VCN 1916 and contained in the data plane VCN 1918 can be communicatively couple to cloud services 1956.

In some examples, the pattern illustrated by the architecture of block diagram 1900 of FIG. 19 may be considered an exception to the pattern illustrated by the architecture of block diagram 1800 of FIG. 18 and may be desirable for a customer of the IaaS provider if the IaaS provider cannot directly communicate with the customer (e.g., a disconnected region). The respective containers 1967(1)-(N) that are contained in the VMs 1966(1)-(N) for each customer can be accessed in real-time by the customer. The containers 1967(1)-(N) may be configured to make calls to respective secondary VNICs 1972(1)-(N) contained in app subnet(s) 1926 of the data plane app tier 1946 that can be contained in the container egress VCN 1968. The secondary VNICs 1972(1)-(N) can transmit the calls to the NAT gateway 1938 that may transmit the calls to public Internet 1954. In this example, the containers 1967(1)-(N) that can be accessed in real-time by the customer can be isolated from the control plane VCN 1916 and can be isolated from other entities contained in the data plane VCN 1918. The containers 1967(1)-(N) may also be isolated from resources from other customers.

In other examples, the customer can use the containers 1967(1)-(N) to call cloud services 1956. In this example, the customer may run code in the containers 1967(1)-(N) that requests a service from cloud services 1956. The containers 1967(1)-(N) can transmit this request to the secondary VNICs 1972(1)-(N) that can transmit the request to the NAT gateway that can transmit the request to public Internet 1954. Public Internet 1954 can transmit the request to LB subnet(s) 1922 contained in the control plane VCN 1916 via the Internet gateway 1934. In response to determining the request is valid, the LB subnet(s) can transmit the request to app subnet(s) 1926 that can transmit the request to cloud services 1956 via the service gateway 1936.

It should be appreciated that IaaS architectures 1600, 1700, 1800, 1900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 20:
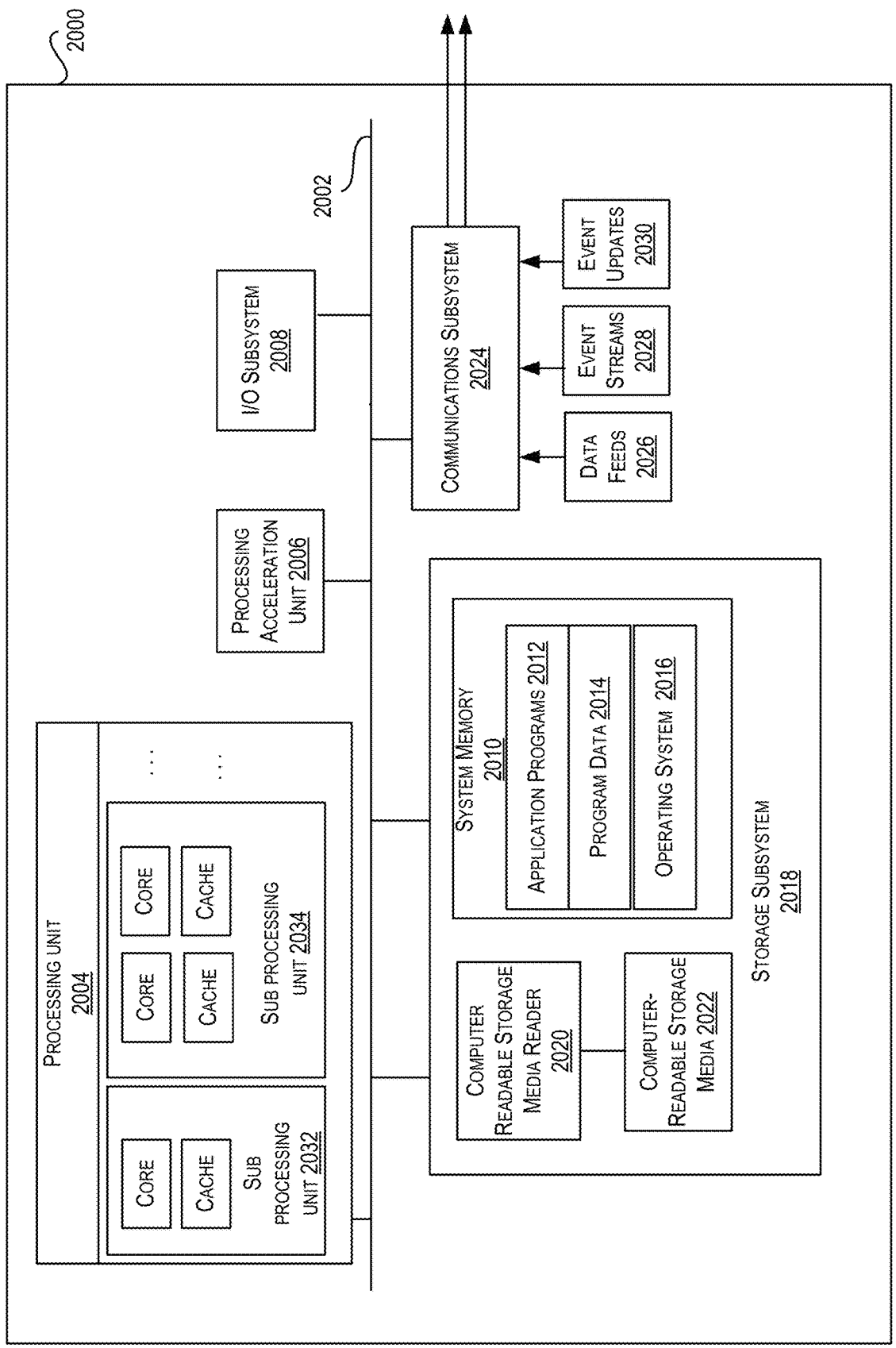
FIG. 20 is a block diagram illustrating an example computer system, according to at least one embodiment.

FIG. 20 illustrates an example computer system 2000, in which various embodiments may be implemented. The system 2000 may be used to implement any of the computer systems described above. As shown in the figure, computer system 2000 includes a processing unit 2004 that communicates with a number of peripheral subsystems via a bus subsystem 2002. These peripheral subsystems may include a processing acceleration unit 2006, an I/O subsystem 2008, a storage subsystem 2018 and a communications subsystem 2024. Storage subsystem 2018 includes tangible computer-readable storage media 2022 and a system memory 2010.

Bus subsystem 2002 provides a mechanism for letting the various components and subsystems of computer system 2000 communicate with each other as intended. Although bus subsystem 2002 is shown schematically as a single bus, alternative embodiments of the bus subsystem may utilize multiple buses. Bus subsystem 2002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2004, which can be implemented as one or more integrated circuits (e.g., a conventional microprocessor or microcontroller), controls the operation of computer system 2000. One or more processors may be included in processing unit 2004. These processors may include single core or multicore processors. In certain embodiments, processing unit 2004 may be implemented as one or more independent processing units 2032 and/or 2034 with single or multicore processors included in each processing unit. In other embodiments, processing unit 2004 may also be implemented as a quad-core processing unit formed by integrating two dual-core processors into a single chip.

In various embodiments, processing unit 2004 can execute a variety of programs in response to program code and can maintain multiple concurrently executing programs or processes. At any given time, some or all of the program code to be executed can be resident in processor(s) 2004 and/or in storage subsystem 2018. Through suitable programming, processor(s) 2004 can provide various functionalities described above. Computer system 2000 may additionally include a processing acceleration unit 2006, which can include a digital signal processor (DSP), a special-purpose processor, and/or the like.

I/O subsystem 2008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2000 may comprise a storage subsystem 2018 that comprises software elements, shown as being currently located within a system memory 2010. System memory 2010 may store program instructions that are loadable and executable on processing unit 2004, as well as data generated during the execution of these programs.

Depending on the configuration and type of computer system 2000, system memory 2010 may be volatile (such as random access memory (RAM)) and/or non-volatile (such as read-only memory (ROM), flash memory, etc.) The RAM typically contains data and/or program services that are immediately accessible to and/or presently being operated and executed by processing unit 2004. In some implementations, system memory 2010 may include multiple different types of memory, such as static random access memory (SRAM) or dynamic random access memory (DRAM). In some implementations, a basic input/output system (BIOS), containing the basic routines that help to transfer information between elements within computer system 2000, such as during start-up, may typically be stored in the ROM. By way of example, and not limitation, system memory 2010 also illustrates application programs 2012, which may include client applications, Web browsers, mid-tier applications, relational database management systems (RDBMS), etc., program data 2014, and an operating system 2016. By way of example, operating system 2016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 2018 may also provide a tangible computer-readable storage medium for storing the basic programming and data constructs that provide the functionality of some embodiments. Software (programs, code services, instructions) that when executed by a processor provide the functionality described above may be stored in storage subsystem 2018. These software services or instructions may be executed by processing unit 2004. Storage subsystem 2018 may also provide a repository for storing data used in accordance with the present disclosure.

Storage subsystem 2000 may also include a computer-readable storage media reader 2020 that can further be connected to computer-readable storage media 2022. Together and, optionally, in combination with system memory 2010, computer-readable storage media 2022 may comprehensively represent remote, local, fixed, and/or removable storage devices plus storage media for temporarily and/or more permanently containing, storing, transmitting, and retrieving computer-readable information.

Computer-readable storage media 2022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2000.

By way of example, computer-readable storage media 2022 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 2022 may include, but is not limited to, Zip® drives, flash memory cards, universal serial bus (USB) flash drives, secure digital (SD) cards, DVD disks, digital video tape, and the like. Computer-readable storage media 2022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 2000.

Communications subsystem 2024 provides an interface to other computer systems and networks. Communications subsystem 2024 serves as an interface for receiving data from and transmitting data to other systems from computer system 2000. For example, communications subsystem 2024 may enable computer system 2000 to connect to one or more devices via the Internet. In some embodiments communications subsystem 2024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2024 can provide wired network connectivity (e.g., Ethernet) in addition to or instead of a wireless interface.

In some embodiments, communications subsystem 2024 may also receive input communication in the form of structured and/or unstructured data feeds 2026, event streams 2028, event updates 2030, and the like on behalf of one or more users who may use computer system 2000.

By way of example, communications subsystem 2024 may be configured to receive data feeds 2026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2024 may also be configured to receive data in the form of continuous data streams, which may include event streams 2028 of real-time events and/or event updates 2030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2024 may also be configured to output the structured and/or unstructured data feeds 2026, event streams 2028, event updates 2030, and the like to one or more databases that may be in communication with one or more streaming data source computers coupled to computer system 2000.

Computer system 2000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
    receiving, by a computing device, a control instruction to generate a document to be used as a training instance for a first machine learning model, the control instruction comprising an element configuration, a document class configuration, a format configuration, and an augmentation configuration, and a data bias and fairness configuration;
    receiving, by the computing device, an element from an interface based at least in part on the element configuration, the element being an image, a text, or a machine-readable visual code simulating a real-world image, a real-world text, or a real-world machine-readable visual code;
    generating, by the computing device, metadata describing a layout for arranging the element on the document based at least in part on the document class configuration;
    generating, by the computing device, a background for the document, wherein the element is arranged on the document over background based at least in part on the metadata, and wherein the background is configured to simulate a real-world document background; and
    generating, by the computing device, the document by arranging the element on the document based at least in part on the metadata, wherein the document is generated in a format based on the format configuration.

2. The method of claim 1, wherein the method further comprises generating a label describing the element for a supervised learning training instance.

3. The method of claim 1, wherein generating metadata describing the layout for the element on the document comprises:
    retrieving a template configuration from the document class configuration, wherein the template;
    generating the metadata describing the layout for the element on the document based at least in part on the template configuration;
    arranging the element on the document based at least in part on the metadata, wherein the arrangement of the element on the document resembles a real-world arrangement on a real world document.

4. The method of claim 1, wherein generating metadata describing the layout for the element on the document comprises:
    determining, based at least in part on the document class configuration, that the document is a template-less document;
    selecting, based at least in part on the document class configuration, a template-less arrangement of the element on the document, wherein the template-less arrangement comprises a non-overlapping placement, a historical knowledge-based placement, or a machine-learning-based placement; and
    arranging the element on the document based at least in part on the selected template-less arrangement.

5. The method of claim 1, wherein the method further comprises augmenting the element on the document based at least in part on the augmentation configuration, and wherein augmenting the element on the document comprises processing the element to simulate visual degradation of the element.

6. The method of claim 1, wherein augmenting the element of the document comprises introducing a noise to the element to generate an adversarial element, and wherein the adversarial element is configured to cause a machine learning model to misclassify the adversarial element.

7. The method of claim 1, wherein the method further comprises:
   receiving the data bias and fairness configuration comprising a target element class distribution;
   identifying an element class of the element arranged on the document;
   comparing the element class to the target element class distribution; and
   determining a data bias and fairness of the document based at least in part on the comparison.

8. A computing device, comprising:
   a processor; and
   a computer-readable medium including instructions that, when executed by the processor, cause the processor to:
      receive a control instruction to generate a document to be used as a training instance for a first machine learning model, the control instruction comprising an element configuration, a document class configuration, a format configuration, an augmentation configuration, and a data bias and fairness configuration;
      receive an element from an interface based at least in part on the element configuration, the element being an image, a text, or a machine-readable visual code simulating a real-world image, a real-world text, or a real-world machine-readable visual code;
      generate metadata describing a layout for arranging the element on the document based at least in part on the document class configuration;
      generate a background for the document, wherein the element is arranged on the document over background based at least in part on the metadata, and wherein the background is configured to simulate a real-world document background; and
      generate the document by arranging the element on the document based at least in part on the metadata, wherein the document is generated in a format based on the format configuration.

9. The computing device of claim 8, wherein the instructions that, when executed by the processor, further cause the processor to generate a label describing the element for a supervised learning training instance.

10. The computing device of claim 8, wherein generating metadata describing the layout for the element on the document comprises:
    retrieving a template configuration from the document class configuration, wherein the template;
    generating the metadata describing the layout for the element on the document based at least in part on the template configuration;
    arranging the element on the document based at least in part on the metadata, wherein the arrangement of the element on the document resembles a real-world arrangement on a real world document.

11. The computing device of claim 8, wherein generating metadata describing the layout for the element on the document comprises:
    determining, based at least in part on the document class configuration, that the document is a template-less document;
    selecting, based at least in part on the document class configuration, a template-less arrangement of the element on the document, wherein the template-less arrangement comprises a non-overlapping placement, a historical knowledge-based placement, or a machine-learning-based placement; and
    arranging the element on the document based at least in part on the selected template-less arrangement.

12. The computing device of claim 8, wherein the instructions that, when executed by the processor, further cause the processor to augment the element on the document based at least in part on the augmentation configuration, and wherein augmenting the element on the document comprises processing the element to simulate visual degradation of the element.

13. The computing device of claim 8, wherein augmenting the element of the document comprises introducing a noise to the element to generate an adversarial element, and wherein the adversarial element is configured to cause a machine learning model to misclassify the adversarial element.

14. The computing device of claim 8, wherein the instructions that, when executed by the processor, further cause the processor to:
    receive the data bias and fairness configuration comprising a target element class distribution;
    identify an element class of the element arranged on the document;
    compare the element class to the target element class distribution; and
    determine a data bias and fairness of the document based at least in part on the comparison.

15. A non-transitory computer-readable medium including stored thereon a sequence of instructions that, when executed by a processor, causes the processor to perform operations comprising:
    receiving a control instruction to generate a document to be used as a training instance for a first machine learning model, the control instruction comprising an element configuration, a document class configuration, a format configuration, an augmentation configuration, and a data bias and fairness configuration;
    receiving an element from an interface based at least in part on the element configuration, the element being an image, a text, or a machine-readable visual code simulating a real-world image, a real-world text, or a real-world machine-readable visual code;
    generating metadata describing a layout for arranging the element on the document based at least in part on the document class configuration;
    generating a background for the document, wherein the element is arranged on the document over background based at least in part on the metadata, and wherein the background is configured to simulate a real-world document background; and
    generating the document by arranging the element on the document based at least in part on the metadata, wherein the document is generated in a format based on the format configuration.

16. The non-transitory computer-readable medium of claim 15, wherein the sequence of instructions that, when executed by a processor, further cause the processor to perform operations comprising generating a label describing the element for a supervised learning training instance.

17. The non-transitory computer-readable medium of claim 15, wherein generating metadata describing the layout for the element on the document comprises:
    retrieving a template configuration from the document class configuration, wherein the template;

generating the metadata describing the layout for the element on the document based at least in part on the template configuration;

arranging the element on the document based at least in part on the metadata, wherein the arrangement of the element on the document resembles a real-world arrangement on a real-world document.

18. The non-transitory computer-readable medium of claim 15, wherein generating metadata describing the layout for the element on the document comprises:

determining, based at least in part on the document class configuration, that the document is a template-less document;

selecting, based at least in part on the document class configuration, a template-less arrangement of the element on the document, wherein the template-less arrangement comprises a non-overlapping placement, a historical knowledge-based placement, or a machine-learning-based placement; and arranging the element on the document based at least in part on the selected template-less arrangement.

* * * * *